(12) United States Patent
Itoh

(10) Patent No.: US 7,856,452 B2
(45) Date of Patent: Dec. 21, 2010

(54) DATA PROCESSOR

(75) Inventor: Masanori Itoh, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/639,166

(22) Filed: Dec. 16, 2009

(65) Prior Publication Data

US 2010/0094914 A1    Apr. 15, 2010

Related U.S. Application Data

(62) Division of application No. 11/568,401, filed as application No. PCT/JP2006/303967 on Mar. 2, 2006, now Pat. No. 7,657,565.

(30) Foreign Application Priority Data

Mar. 4, 2005   (JP)   ............................... 2005-060124

(51) Int. Cl.
    *G06F 17/30*    (2006.01)
(52) U.S. Cl. ...................... 707/791; 707/802; 707/822; 707/828
(58) Field of Classification Search .......... 707/600–831
    See application file for complete search history.

(56) References Cited

U.S. PATENT DOCUMENTS

| | | | |
|---|---|---|---|
| 5,572,466 A | 11/1996 | Sukegawa | |
| 6,078,727 A | 6/2000 | Saeki et al. | |
| 6,374,266 B1 | 4/2002 | Shnelvar | |
| 6,385,690 B1 | 5/2002 | Iida et al. | |

(Continued)

FOREIGN PATENT DOCUMENTS

JP    11-155130    6/1999

(Continued)

OTHER PUBLICATIONS

International Search Report for corresponding Application No. PCT/JP2006/303967 mailed Apr. 11, 2006.

(Continued)

*Primary Examiner*—Isaac M Woo
(74) *Attorney, Agent, or Firm*—Renner, Otto, Boisselle & Sklar, LLP

(57) ABSTRACT

To provide a technique of writing data efficiently on a storage medium and thereby play back a content continuously. Specifically, the file allocation table (FAT) of a storage medium is supposed to be read on a partial FAT basis and data is written by a preferred method for that reading method.

A data processor writes a content data stream on a storage medium, on which a data storage location is defined based on a file allocation table (FAT). The processor includes: a control section for determining the amount of data to be read continuously until a portion of the data stream, which should be played back during a data stream reading suspended period, is acquired, the suspended period including at least a time for reading a partial FAT forming a part of the FAT; an area detecting section for detecting an available area, in which that amount of data is storable, from a partial area managed by a single partial FAT; and a writing section for writing the content data stream on the available area, whereby the data stream is readable, and the content is playable, based on the partial FAT.

2 Claims, 16 Drawing Sheets

U.S. PATENT DOCUMENTS

2003/0110514 A1* 6/2003 West et al. .................. 725/134
2006/0126469 A1  6/2006 Urushibara et al.

FOREIGN PATENT DOCUMENTS

| JP | 2001-109582 | 4/2001 |
|---|---|---|
| JP | 2002-343030 | 11/2002 |
| JP | 2003-059196 | 2/2003 |
| JP | 2003-316627 | 11/2003 |
| JP | 2004-078410 | 3/2004 |

OTHER PUBLICATIONS

Form PCT/ISA/237 for International Application No. PCT/JP2006/303967 and concise explanation.
Co-pending U.S. Appl. No. 11/575,407, filed Mar. 16, 2007.
Co-pending U.S. Appl. No. 11/575,408, filed Mar. 16, 2007.

* cited by examiner

| Item | Unit |
|---|---|
| Data Size of VOBU | Number of Packs |
| Address of a Pack Including End of I-Picture at Top of VOBU (Offset Value from Top of VOBU) | Number of Packs |
| Number of Fields Included in VOBU | Number of Fields |

FAT1
(a)

Storage Area of Memory Card (32 GB)
(b)

Data Size of Data Stream in Each Window Area

20 KB (<Continuous Recording Unit Length of 64 KB)

10 MB

50 KB (<Continuous Recording Unit Length of 64 KB)

DATA PROCESSOR

This application is a divisional of U.S. patent application Ser. No. 11/568,401 filed Oct. 27, 2006 now U.S. Pat. No. 7,657,565, which is a §371 (c) of International Application No. PCT/JP2006/303967, filed Mar. 2, 2006, and also claims priority to Japanese Application No. 2005-060124 filed on Mar. 4, 2005, the entire disclosures of which are incorporated herein by reference.

TECHNICAL FIELD

The present invention relates to the technique of recording and playing back a data stream, representing a content, on/from a storage medium in which an FAT file system has been established. More particularly, the present invention relates to data stream recording and playback processing for continuously playing back moving pictures, audio or any other content based on a data stream that is stored on a storage medium.

BACKGROUND ART

Recently, various types of digital appliances (such as optical disk recorders and camcorders) that can write and store digital data, representing a content, on a number of types of media including an optical disk such as a DVD, a magnetic disk such as a hard disk, and a semiconductor memory, have become more and more popular. The content may be a broadcast program or the video and audio that have been captured with a camcorder, for example.

Also, PCs often have the functions of recording, playing and editing a content lately, and may also be regarded as being included in those digital appliances. In writing data such as document data, PCs have used various media such as a hard disk, an optical disk and a semiconductor memory. That is why a file system that has a data management structure compatible with a PC such as a file allocation table (FAT) has been adopted in such media. The FAT 32 system that is often adopted currently can handle a file that may have a maximum size of 4 gigabytes or can manage a medium with a maximum storage capacity of 2 terabytes.

The bigger the maximum storage capacity of a medium, the longer the overall content recording duration. The optical disks, hard disks, semiconductor memories and so on are so-called "randomly accessible" media. Therefore, when a data stream representing a content with a long duration is stored on such a medium, it would be convenient if playback could be started from any arbitrary location of the content.

For example, Patent Document No. 1 identified below generates time map information, defining correspondence between a playback time and the address at which the AV data to play back at the time is stored, at regular time intervals from the beginning of a data stream. If the start time and end time, specified by the user, are converted into a start address and an end address, respectively, by reference to the time map information and if the data stored at those addresses are read, the content can start being played back at the specified time.

Meanwhile, a lot of storage media, in which the FAT file system has been established, are currently available for sale. For instance, a removable semiconductor memory (i.e., a memory card) usually has its file management done by an FAT file system.

In a semiconductor memory, the target recording address is specified on the basis of a data unit of 512 bytes, which is called a "sector". A logical address is allocated to each address on a sector-by-sector basis.

In an FAT file system on the other hand, the availability and non-availability of the storage areas are managed on the basis of a unit called "cluster". For example, if the semiconductor memory has a storage capacity of 2 gigabytes or less, then one cluster has a data size of 32 sectors (i.e., 16 kilobytes). In that case, a file system called "FAT 16" is used. However, if the semiconductor memory has a storage capacity exceeding 2 gigabytes, then one cluster has a data size of 64 sectors (i.e., 32 kilobytes). In that case, a file system called "FAT 32" is used.

In recording a data stream on such a semiconductor memory, the writing rate varies with the degree of continuity between the sectors to be written. For example, if the sectors to be written had non-serial numbers, then the writing rate would decrease. This is because if a written sector and a sector to be written were included in the same cluster, then the written data should be read once and rewritten and then new data should be written, thus causing a processing delay.

Stated otherwise, if writing is done continuously on a number of consecutive sectors or clusters, then data can be written at a higher rate than an ordinary writing rate that is supposed to be adopted in normal applications.

Patent Document No. 1: Japanese Patent Application Laid-Open Publication No. 11-155130

DISCLOSURE OF INVENTION

Problems to be Solved by the Invention

The recent huge increase in the storage capacity of storage media, however, could cause various problems.

First of all, as the capacity of a storage medium is increased, the data size of the FAT also increases. For example, when the storage capacity reaches 32 gigabytes, the data size of the FAT becomes as much as 4 MB. If the system should read and retain the entire FAT of such a huge data size, then an internal memory with an appropriately big capacity should be provided, thus increasing the manufacturing cost significantly. In addition, the user would have to wait until the FAT is read entirely. Thus, the response of the system to the user's manipulations would decrease. For these reasons, an improved FAT reading method is now in high demand.

To avoid the cost problem, only a part of the FAT may be read and retained in a cache memory. According to such a method, however, it would be troublesome to change the FAT tables in the cache memory as the FAT chain is tracked during the playback operation, and the chances of failing to play back the content continuously would increase. More specifically, if the content data storage locations discontinued during the playback operation, then the processing of reading the FAT table and registering it with the cache memory again would have to be carried out frequently. Particularly while the FAT is being read, the content reading is suspended. Thus, the video and audio data accumulated in the buffer could be exhausted in the meantime. In that case, some of the moving pictures could be missing and the audio could discontinue for a while.

An object of the present invention is to provide a method of writing data efficiently on a storage medium, in which an FAT file system has been established, in order to play back a content continuously, and also provide an apparatus to carry out such a method. Another object of the present invention is to read the data that has been written by such a method and apparatus and play back a content continuously.

Means for Solving the Problems

A data processor according to the present invention writes a data stream which represents a content in a storage medium, having a storage location of data defined based on a file allocation table (FAT). The data processor includes: a control section operable to determine an amount of data to be read continuously until a portion of the data stream, which should be played back during a data stream reading suspended period, is acquired, the data stream reading suspended period including at least a time for reading a partial FAT, which forms a part of the FAT; an area detecting section operable to detect an available area, in which the determined amount of data is storable, from a partial area managed by a single partial FAT; and a writing section operable to write the content data stream on the available area, whereby the data stream is readable, and the content is playable, based on the partial FAT.

The storage medium may have a predetermined continuous data unit, which is readable at a rate that is equal to or higher than a playback rate of the data stream. Each said partial area may be a collection of the continuous data units. And the area detecting section may detect the available area, including at least one of the continuous data units, from the partial area.

The area detecting section may detect the available area in the partial area that is managed by one of the partial FATs.

The area detecting section may detect the available area, which is present continuously within the partial area and which has an area length that is equal to or greater than the amount of data.

The area detecting section may detect a plurality of available areas, which are present discretely in the partial area and which have a sum of the area lengths of which is equal to or greater than the determined amount of data.

The control section may determine the amount of data to be read continuously to be equal to or greater than Vr×Vo ×t/ (Vr−Vo), where Vr is a transfer rate of data that is read from the predetermined continuous data unit, t is an amount of time it takes to read the partial FAT, and Vo is a bit rate of the data stream to be recorded. And the writing section may write the determined amount of data.

The area detecting section may detect a plurality of available areas, which are present in the partial area managed by a single partial FAT and the sum of the area lengths of which corresponds to the determined amount of data.

The writing section may write the data stream in at least part of the detected available area.

The writing section may write at least one of data representing a top portion of the data stream and/or data representing an end portion of the data stream on a portion of the detected available area.

Another data processor according to the present invention includes: a reading section operable to read a partial FAT, which forms a part of a file allocation table (FAT), from a storage medium in which a storage location of data is defined by the FAT; a control section operable to instruct said reading section to read a data stream representing a content from the storage medium based on the partial FAT; and a decoding section operable to play back the content based on the data stream that has been read. After at least a predetermined amount of a first data stream has been read based on a first partial FAT and while playback processing is carried on by said decoding section, said reading section reads a second FAT that follows the first FAT. The control section instructs said reading section to read a second data stream based on the second FAT. And the predetermined amount is an amount of data to be read continuously until a portion of the data stream, which should be played back during a data stream reading suspended period, is acquired. The data stream reading suspended period includes at least a time for reading the second partial FAT.

The storage medium may have a predetermined continuous data unit, which is readable at a rate that is equal to or higher than a playback rate of the data stream. Each of partial areas to be managed based on the first partial FAT or the second partial FAT may be a collection of the continuous data units. The control section may instruct the reading section to read the data stream based on the partial FAT. And the reading section may read the data stream at a rate that is equal to or higher than a playback rate of the data stream.

Effects of the Invention

According to the present invention, data is written on a storage medium on the supposition that an FAT is read on a little-by-little basis. More specifically, the recorder calculates the data size of a content to be played back during an amount of time it takes to read a part of the FAT (i.e., a partial FAT), detects an available area, in which the data of that data size can be stored, in the storage area on the storage medium, and then writes the content data stream on that available area. The available area is ensured in a partial area that is managed by a single partial FAT.

By adopting such a method, even if the apparatus performs partial reading of the FAT and data stream reading alternately, the data needed for playback processing can be ensured without fail. As a result, the content can be played back seamlessly and continuously based on the data stream. In addition, since the playback can be carried out by reading the FAT little by little, the capacity of the memory to retain the FAT can be much smaller than the data size to retain the entire FAT on a memory. Consequently, the cost of the buffer memory required for the apparatus can be reduced.

On top of that, compared to the situation where the playback processing is not started until the FAT has been once read entirely, the FAT needs to be read just partially, thus reducing the user's wait significantly.

Figure 1:
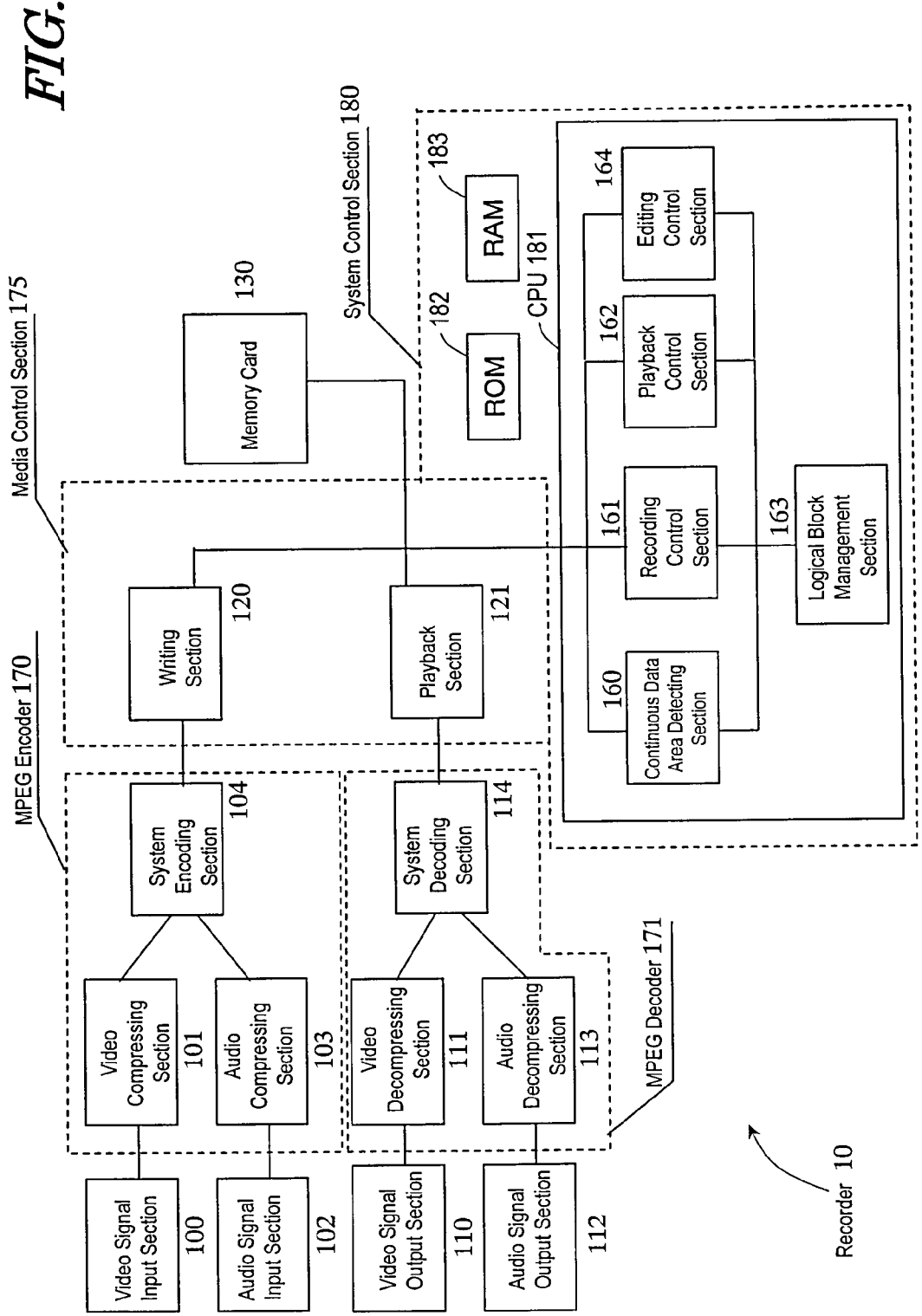
FIG. 1 is a diagram showing a configuration for a recorder 10 according to a first preferred embodiment of the present invention.

DESCRIPTION OF REFERENCE NUMERALS 10 recorder
100 video signal input section
101 video compressing section
102 audio signal input section
103 audio compressing section
104 system encoding section
110 video signal output section
111 video decompressing section
112 audio signal output section
113 audio decompressing section
114 system decoding section
120 writing section
121 reading section
130 removable memory card
160 continuous data area detecting section
161 writing control section
162 reading control section
163 logical block management section
164 editing control section
170 MPEG encoder
171 MPEG decoder
175 media control section
180 system control section
181 CPU
182 ROM
183 RAM

BEST MODE FOR CARRYING OUT THE INVENTION

Embodiment 1

Hereinafter, a preferred embodiment of a data processor according to the present invention will be described with reference to the accompanying drawings.

FIG. 1 illustrates a configuration for a recorder 10 according to this preferred embodiment. The recorder 10 has the function of writing a data stream representing moving pictures with video and audio (which will be referred to herein as a "moving picture stream") on a memory card 130 (which will be referred to herein as a "recording function"). The recorder 10 also has the function of reading the moving picture stream from the memory card 130 and playing back the moving pictures (which will be referred to herein as a "playback function"). And the recorder 10 further has the function of editing the moving picture stream that has been written on the memory card 130 (which will be referred to herein as an "editing function"). The recorder 10 may be a portable camcorder or a fixed recorder for recording TV programs, for example.

Hereinafter, the respective components of the recorder 10 will be described one by one. The recorder 10 includes a video signal input section 100, an audio signal input section 102, a video signal output section 110, an audio signal output section 112, an MPEG encoder 170, an MPEG decoder 171, a media control section 175, a system control section 180 and a CPU 181.

A memory card 130 is inserted in a removable state into the recorder 10 and moving pictures can be recorded on the memory card 130. It should be noted that the memory card 130 is not an essential component of the recorder 10.

The video signal input section 100 may be a CCD camera or a video input terminal (not shown) that is connected to an antenna (not shown), for example. The audio signal input section 102 may be a microphone or an audio input terminal (not shown) that is connected to an antenna (not shown), for example.

The MPEG encoder 170 (which will be simply referred to herein as an "encoder 170") includes a video compressing section 101, an audio compressing section 103 and a system encoding section 104. The video compressing section 101 receives a video signal from the video signal input section 100 and compresses and encodes the signal compliant with an MPEG standard. The audio compressing section 103 receives an audio signal from the audio signal input section 102 and (compresses and) encodes the signal compliant with an MPEG standard. As a result, video data and audio data are output.

The system encoding section 104 interleaves the video data and the audio data with each other, thereby generating a moving picture stream. More specifically, the system encoding section 104 makes packets that store video data and packets that store audio data and arranges those packets to generate a moving picture stream. In this case, other types of data (such as character data and management information) may also be packetized and the resultant packets may also be arranged as portions of the moving picture stream.

The media control section 175 includes a writing section 120 and a reading section 121, which respectively control writing and reading of a moving picture stream or any other type of data on/from the memory card 130.

In this preferred embodiment, the memory card 130 is supposed to be a storage medium that complies with some standard (e.g., an SD memory card), and the moving picture stream to be written on the memory card 130 is supposed to be a program stream that complies with the MPEG-2 standard. The program stream consists of fixed-length data units called "packs", which are known as an exemplary form of packets. The configuration of the memory card 130 and the data structure of the program stream will be described in detail later with reference to FIGS. 2 through 6.

The other components of the recorder 10 will be described. The MPEG decoder 171 (which will be simply referred to herein as a "decoder 171") includes a video decompressing section 111, an audio decompressing section 113, and a system decoding section 114. The operations of these components will be described in the order of processing. Specifically, the system decoding section 114 splits the moving picture stream (i.e., a program stream) according to the types of the packets and sends the packets including video data to the video decompressing section 111 and the packets including audio data to the audio decompressing section 113, respectively. The video decompressing section 111 decompresses the video data compliant with the MPEG standard and passes the decompressed data to the video signal output section 110. The audio decompressing section 113 decompresses the audio data compliant with the MPEG standard, for example, and passes the decompressed data to the audio signal output section 112.

The video signal output section 110 may be a liquid crystal display screen if the recorder 10 is a camcorder and may be a video signal output terminal if the recorder 10 is a fixed recorder. The audio signal output section 112 may be a loudspeaker or an audio signal output terminal, for example.

The system control section 180 includes a CPU 181, a ROM 182 and a RAM 183. The CPU 181 may read a computer program from the ROM 182, extend the program on the RAM 183 and get it executed, thereby realizing various functions. The CPU 181 may function as a continuous data area detecting section 160, a writing control section 161, a reading control section 162, a logical block management section 163 and an editing control section 164, for example. In the following description, these functions realized by the CPU 181 will be regarded as independent hardware components. The exchange of data between these components corresponds to the exchange of the data between programs.

Before starting to record a program stream, the writing control section 161 activates and instructs the continuous data area detecting section (which will be simply referred to herein as an "area detecting section") 160 to look for an available area. By using the FAT that has been read in advance from the memory card 130, the area detecting section 160 searches an available area management table, which was compiled during initializing processing, for a continuous available area. On finding an available area as a result of the search, the area detecting section 160 starts recording the program stream on the available area. And until the area detecting section 160 finishes writing the program stream on the available area detected, the detecting section 160 continues searching for the next available area and recording the program stream.

On the other hand, at the time of a playback operation, when the user selects a content to play back, the reading control section 162 controls the reading section 121 to read the management information of a program stream, corresponding to the content, from a management file and then read a program stream by reference to the address information described on the management file. Then, the system decoding section 114 splits this program stream into a video signal and an audio signal, which are output to the video signal output section 110 and audio signal output section 112 by way of the video decompressing section 111 and the audio decompressing section 113, respectively.

In editing moving pictures, the editing control section 164 receives an instruction to edit a portion of a recorded content, for example, from the user. In this case, the editing control section 164 instructs the reading section 121 to read a portion of the data stream to edit and its management data. When editing is done by deleting a portion of the content, for example, the editing control section 164 finds a portion to delete from the read data and deletes that portion. Then, the editing control section 164 instructs the writing section 120 to write the non-deleted remaining data and its management data on the memory card 130.

Hereinafter, the data management structure and logical structure of the memory card 130 will be described with reference to FIGS. 2 and 3. After that, an exemplary data structure of a data stream to be written on the memory card 130 will be described with reference to FIGS. 4 through 6.

Figure 2:
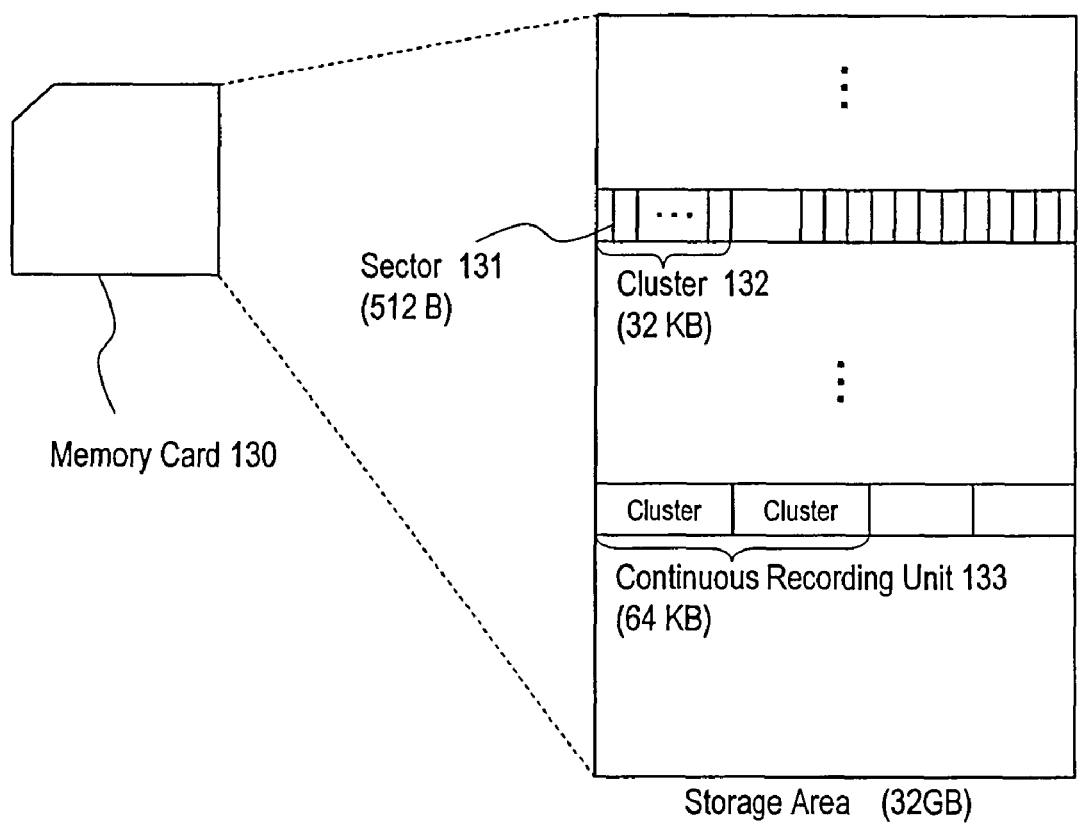
FIG. 2 shows the data management structure of the memory card 130.

FIG. 2 shows the data management structure of the memory card 130. In this preferred embodiment, the memory card 130 is supposed to have a storage capacity of 32 gigabytes and its file is supposed to be managed by the FAT 32 file system.

In the memory card 130, the minimum unit of reading and writing data is a sector 131. An address is given to each sector 131, and therefore, any sector can be located by its address without fail. The data size of each sector 131 is supposed to be 512 bytes.

A cluster 132 called a "logical block" is made up of a plurality of sectors 131. The cluster 132 is an available area management unit and an area reading/writing unit. The number of sectors that form the cluster 132 (i.e., the data size of the cluster 132) is supposed to be determined by the storage capacity of the memory card 130. For example, if the storage capacity of the memory card 130 is 1 gigabyte or less, the data size of one cluster is supposed to be 16 kilobytes. On the other hand, if the storage capacity of the memory card 130 exceeds 1 gigabyte, the data size of one cluster is supposed to be 32 kilobytes. In this preferred embodiment, one cluster is made up of 64 sectors and has a data size of 32 kilobytes.

Furthermore, a continuous recording unit 133 is defined for the memory card 130. The continuous recording unit 133 is a data unit, which is specified as a condition to be satisfied by the memory card 130 to accomplish its writing performance value and which should be accessed as a continuous sector or continuous cluster area. The data size of the continuous recording unit 133 is supposed to be determined in advance and retained in a predetermined register (not shown) in the card, for example. In this preferred embodiment, the continuous recording unit 133 is supposed to be made up of two continuous clusters and have a data size of 64 kilobytes.

Besides, a continuous playback unit is also defined for the memory card 130. The continuous playback unit is a data unit, which is specified as a condition to be satisfied by the memory card 130 to accomplish its reading performance value and which should be accessed as a continuous sector or continuous cluster area. The data size of the continuous playback unit is supposed to be determined in advance and retained in a predetermined register (not shown) in the card, for example. In this preferred embodiment, the continuous playback unit is supposed to have a continuous data size of 16 kilobytes. Generally speaking, the writing rate is slower than the reading rate, and therefore, the continuous recording unit often has a bigger data size than the continuous playback unit.

In the memory card 130, the amount of time it takes to read four or eight sectors of data from an arbitrary logical address is determined in advance and retained in a predetermined register in the card. This is necessary to guarantee a reading rate in reading a directory entry or a part of the FAT, in particular.

In addition, the size of the write buffer is also supposed to be determined in advance for the memory card 130 and retained in a predetermined register in the same card, too. Furthermore, the processing time it takes to finish writing data corresponding to this buffer size is also supposed to be determined in advance and registered in the register in the memory card.

It should be noted that a storage area of the memory card 130 consisting of a number of continuous clusters, of which the data size is at least equal to that of the continuous recording unit 133, will be referred to herein as a "continuous recording area". The continuous recording areas may have data sizes of 16 kilobytes to 2 MB according to the performance of the memory card.

Figure 3:
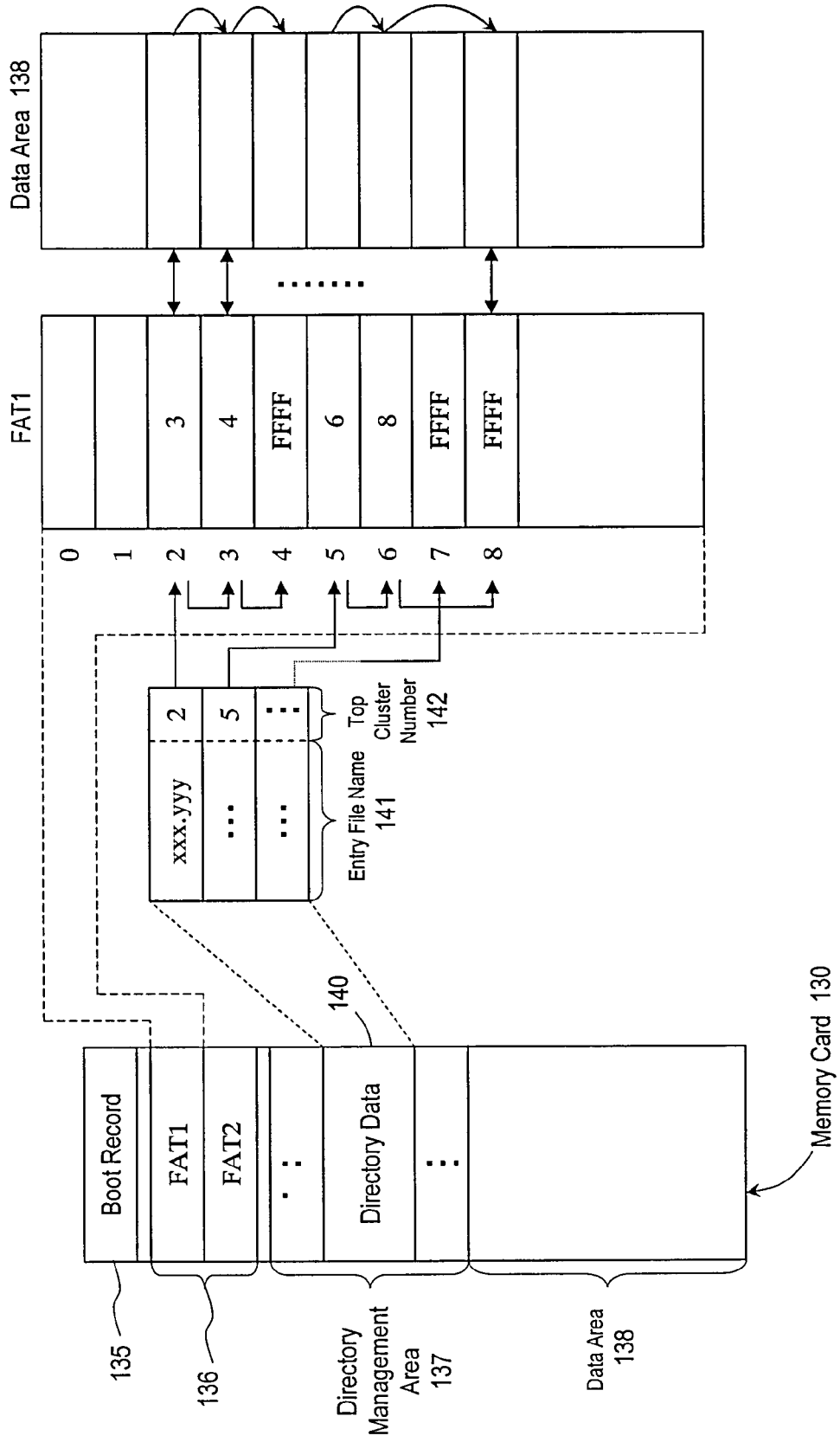
FIG. 3 shows how data management is done on the memory card 130 by an FAT file system.

FIG. 3 shows how data management is done on the memory card 130 by the FAT 16 file system. First, the arrangement of storage areas in the memory card 130 will be described. The memory card 130 includes a boot record area 135, an FAT area 136, a directory management area 137 and a data area 138.

In the boot record area 135, stored are the boot record of the OS and information about the type of the file system on a partition basis, for example. The information written on the memory card is stored as a file of a directory, of which the hierarchical structure is an arbitrary tree structure that branches from a root directory as the top.

There are two FATs (FAT1 and FAT2) in the FAT area 136. FAT2 is a copy of FAT1 and provided as a reserve. Each FAT is defined as a table of cluster numbers. The cluster numbers that are set in the FAT will be referred to herein as "FAT entries".

In the directory management area 137, root directory data is stored. If there is a sub-directory, then the sub-directory data is stored in the data area 138. The directory data 140 shown in FIG. 3 will be described as an example. The directory data 140 is compiled as a table consisting of at least one directory entry. Each directory entry includes fields to store a file name, an extension, a file attribute, an update time, a file size and a data storage cluster number, respectively. In FIG. 3, a file name field 141 showing the contents of the data written and a top cluster number field 142 are shown.

In the data area 138 of the memory card 130, data about the directory management area of a directory, which is lower in order than the root directory, and file contents data are written.

Hereinafter, it will be described how to read a file "xxx.yyy" using an FAT. First, by reference to the respective directory data in the directory management area 137, the entry file name field 141 in which "xxx.yyy" is described is located. Then, the value of the top cluster number field 142 associated with the field 141 is read. In this example, the top cluster number has a value of "2", which indicates that the top portion data of the file "xxx.yyy" was written on cluster #2. Thus, data starts to be read from that cluster.

Next, FAT1 is referred to, thereby getting a table value associated with cluster #2. In the example illustrated in FIG. 3, a table value at the location pointed by the arrow is referred to, thereby getting a value "3", which shows the cluster number in which the data that follows is stored. Thus, data may be read from cluster #3 next. After that, by referring to FAT1, a table value of "4" associated with cluster #3 is gotten, and data is read from cluster #4. If a predetermined table value (e.g., "FFFF" in FIG. 3) shows up, then it means that the cluster is the last cluster of the file "xxx.yyy".

By tracing the FAT as described above, it can be seen in what order the clusters storing the file data need to be read. That is to say, by using the FAT, the sequence of the data that are dispersed in a plurality of clusters is managed. As can be seen easily from the foregoing description, a file is managed by using both the directory and the FAT according to the FAT file system.

Next, an exemplary data structure of the data stream to be written on the memory card 130 will be described with reference to FIGS. 4 through 6.

Figure 4:
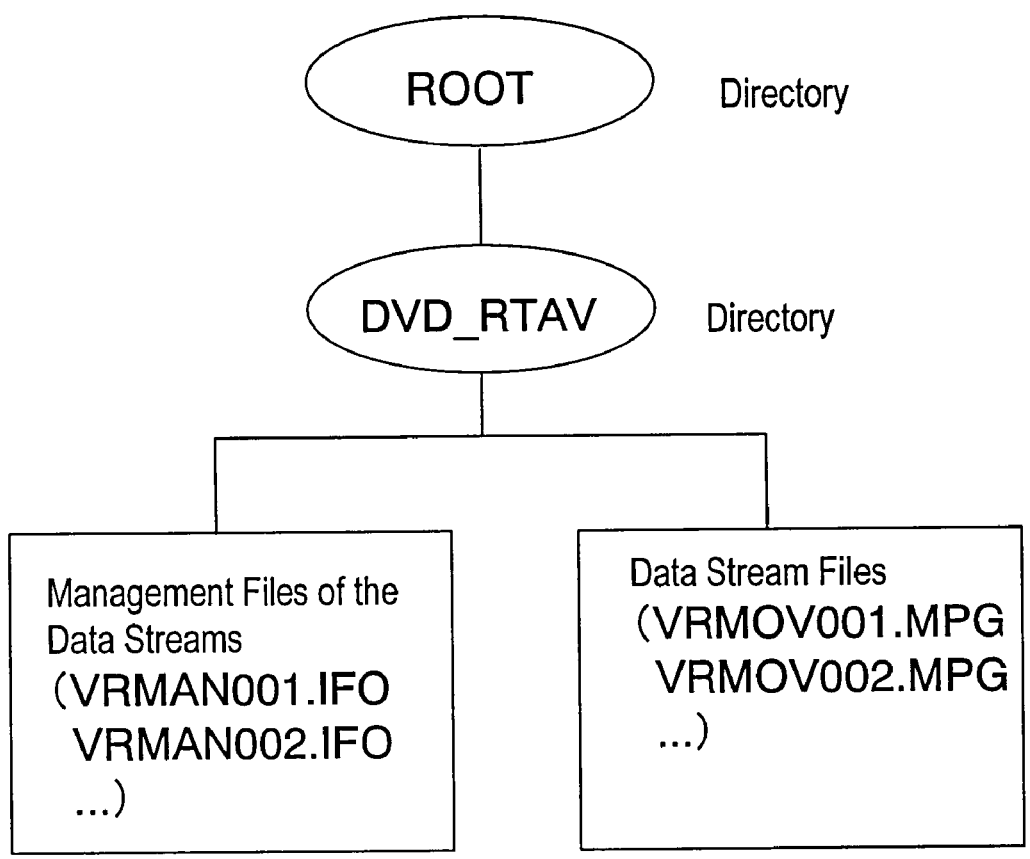
FIG. 4 shows the hierarchical structure of a file system for the memory card 130.

FIG. 4 shows an exemplary hierarchical structure of a file system for the memory card 130. In this example, a sub-directory DVD_RTAV is provided under a root directory ROOT and a management file and a data stream file are supposed to be stored in the sub-directory.

As shown in FIG. 4, a management file for a data stream VRMOV001.MPG may be VRMAN001.IFO, for example. In the same way, a management file for a data stream VRMOV002.MPG may be VRMAN002.IFO.

The directory structure shown in FIG. 4 is reflected in the directory management area 137 of the memory card 130 shown in FIG. 3. The order in which the respective component data of each file are written on a cluster can be seen based on FAT1.

Hereinafter, the data structure of a data stream file will be described with reference to FIG. 5. After that, the data structure of the management file will be described with reference to FIG. 6.

Figure 5:
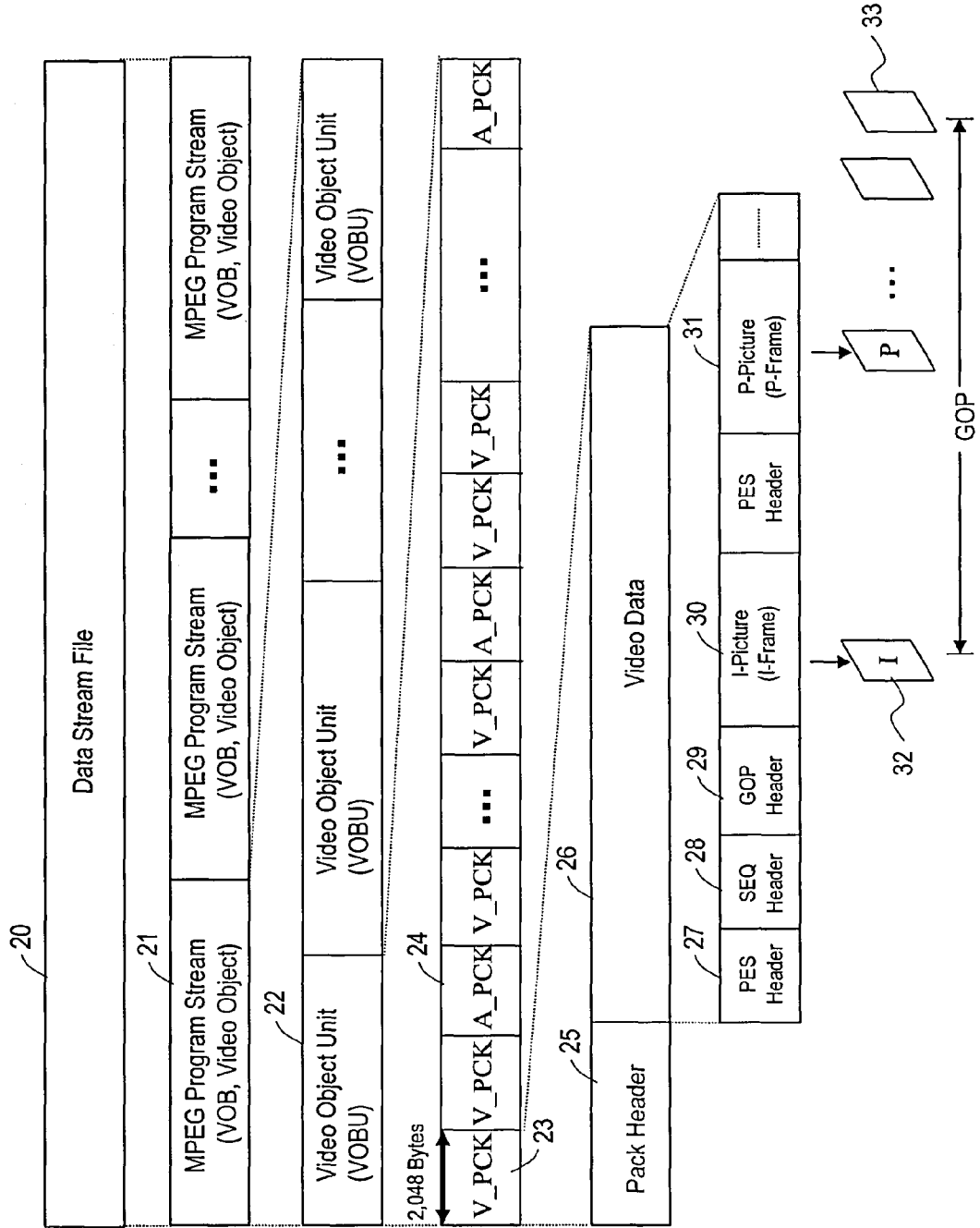
FIG. 5 shows the data structure of a data stream file 20.

FIG. 5 shows the data structure of a data stream file 20. In this preferred embodiment, the data stream is a program stream compliant with the MPEG-2 standard. The data structure to be described below is supposed to be compliant with the DVD Video Recording standard for recording moving pictures on an optical disk such as a DVD-RAM or a DVD-RW. The DVD Video Recording standard defines only one stream file and only one management file. According to this preferred embodiment, however, one stream file and its associated management file are supposed to be recorded every time recording is started and stopped as shown in FIG. 4.

The data stream file 20 includes a plurality of video objects (VOBs) such as an MPEG program stream 21. And each VOB consists of more than one video object unit (VOBU).

Each VOBU consists of a plurality of packs, each of which has a size of 2,048 bytes, forms the low-order layer of the MPEG program stream, and includes an amount of data corresponding to a video playback duration of 0.4 to 1 second.

Take the VOBU 22 as an example. The VOBU 22 includes two types of packs, i.e., video packs (V_PCK) 23 in which compressed video data are stored and audio packs (A_PCK) 24 in which compressed audio data are stored. If the video data is played back from all video packs V_PCK 23 in the VOBU 22, that is the video with a duration of 0.4 to 1 second as described above. On the other hand, the audio data in the VOBU 22 is used to decode respective audio frames. The data of one audio frame is never stored across any VOBU boundary.

Optionally, a real time data information pack (RDI_PCK) may be recorded at the top of each VOBU. If necessary, management information for managing playback (such as letterbox information) may be stored in the RDI pack.

In the program stream 21, stored are various types of time information including a system clock reference (SCR) and video and audio decoding time stamps (DTS) and presentation time stamps (PTS). The system clock reference (SCR) is used to set a reference value for the STC register of a player. A sync signal (STC) is generated based on this reference value. At a time when the value of the sync signal (STC) agrees with that of the decoding time stamp (DTS), the video and audio are decoded. And at a time when the value of the sync signal (STC) agrees with that of the presentation time stamp (PTS), the video and audio are output. In this preferred embodiment, the system clock reference (SCR), video decoding time stamp (DTS) and video presentation time stamp (PTS) in a single continuous program stream (VOB) are supposed to have values that change continuously in predetermined periods.

The first video pack 23 of each VOBU includes a pack header 25 and pack data (video data) 26. The video data 26 further includes a sequence header 28, a GOP header 29 and compressed I-picture data 30. In FIG. 5, a PES header and P-picture frame data 31 are also shown.

It should be noted that the data size of I-picture data is usually big and may sometimes be way over 2,048 bytes. That is why only a portion (e.g., the top) of the I-picture data is stored in the video data 26 in almost all cases.

A number of pictures from the I-picture 32 through a picture 33 form a single group of pictures (GOP). The GOP is a presentation unit consisting of a plurality of video frames that start with the I-picture 32 (i.e., a video frame that can be presented by itself) and end with the picture 33 (that is immediately before the next I-picture) and that include P-pictures and/or B-pictures.

Next, the data structure of the management file will be described with reference to FIG. 6, which shows exemplary management information for a program stream. The management information is generated on a VOBU basis. FIG. 6 shows that management information is provided for each VOBU.

As the management information, defined are the VOBU data size of each VOBU, the address offset value of a pack including the end of an I-picture at the top of the VOBU, and the number of video fields included in the VOBU. As is clear from FIG. 5, if there are a number of VOBs, the number of sets of management information provided as shown in FIG. 6 should be the same as that of the VOBs.

Next, the processing to be done by the recorder 10 will be described. The recorder 10 of this preferred embodiment writes a moving picture data stream on the memory card 130 while predicting what will happen during the playback processing. Thus, the playback processing will be described first. After that, recording processing to be done such that the playback of a content is never discontinued by the playback processing will be described.

Figures 6, 7:
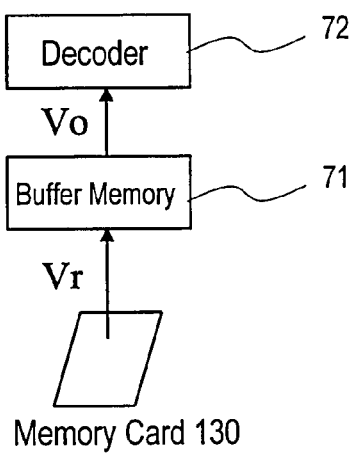
FIG. 6 shows exemplary management information for a program stream.
FIG. 7 shows a data stream playback model using a buffer memory 71 and a decoder 72.

FIG. 7 shows a data stream playback model using a buffer memory 71 and a decoder 72, which correspond to the memory in the buffer memory shown in FIG. 1 and to the decoder 171 shown in FIG. 1, respectively. Optionally, the MPEG decoder 171 may include a memory corresponding to the buffer memory 71 as its internal memory.

Suppose the rate of reading data from the memory card 130 to the buffer memory 71 is Vr and the highest rate of transferring data from the buffer memory 71 to the decoder 72 (i.e., the highest playback rate) is Vo.

Figure 8:
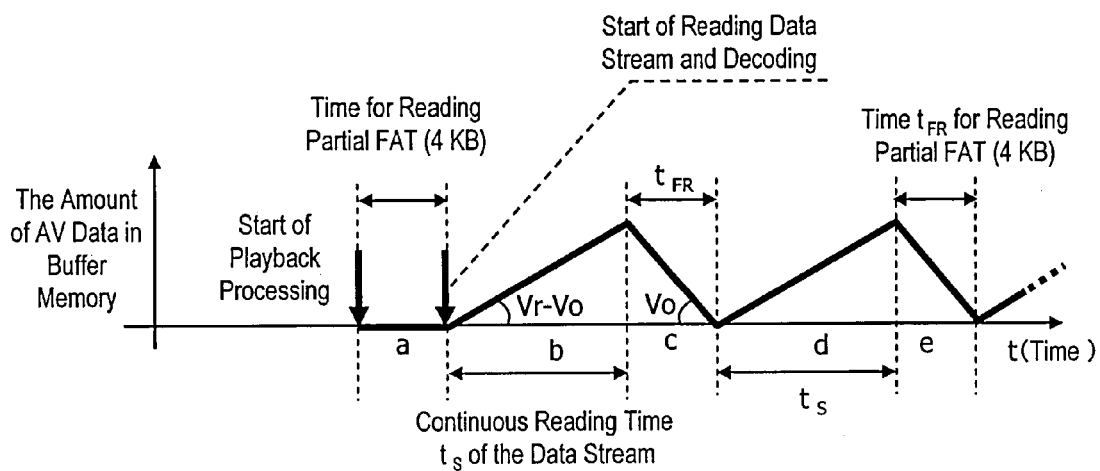
FIG. 8 shows how the amount of data accumulated in the buffer memory 71 changes with time when the playback model shown in FIG. 7 is adopted.

FIG. 8 shows how the amount of data accumulated in the buffer memory 71 changes with time in a worst case and when the playback model shown in FIG. 7 is adopted. In FIG. 8, the ordinate represents the amount of data and the abscissa represents the time.

In the playback processing of this preferred embodiment, not all but just a part of the FAT is read from the memory card 130 at the beginning of the playback. This is because since a 32 GB memory card 130 should have an FAT with a data size of as much as 4 MB, it would take an increased cost to provide a recorder 10 with a memory that can retain such an FAT. Also, if the FAT should be read entirely at the start of playback processing, then the user would have to wait in the meantime. Consequently, the response of the apparatus to user's manipulations would slow down. That situation may arise at the start of playback processing if the user has turned ON the recorder 10 and selected a playback mode by turning a mode switch (not shown). It should be noted that at the start of recording processing, the FAT is supposed to be read fully while moving picture compression processing is being carried out. This is because at the start of the recording processing, the card access is not so dense as at the start of the playback processing.

That part of the FAT to be read will be referred to herein as a "partial FAT". The partial FAT may have a data size of 4 kilobytes, for example, which is a data length corresponding to eight sectors.

In the playback processing, reading of the 4 KB partial FAT and reading of a data stream from a cluster being managed by the partial FAT are carried out alternately. Then, the decoder 72 receives and decodes the data stream that has been read, thereby playing back video, audio and so on.

Since the memory card is managed by the FAT 32 and since the partial FAT has a data size of 4 kilobytes, the size of the storage area to be managed by the 4 KB partial FAT is: one cluster size×(4 KB/4)=32 KB×1,024=32 MB. In the following description, the storage area managed by this partial FAT will be referred to herein as a "window" and its size a "window size".

Referring to FIG. 8, the interval a just after the playback processing has started corresponds to the period to read the partial FAT before decoding is started. The maximum values of the intervals a, c and e are equal to each other and identified by $t_{FR}$. The next interval b corresponds to the period to read the data stream based on the partial FAT. The length of the interval b is identified by $t_S$.

In the interval b, the buffer memory 71 sends the accumulated data stream to the decoder 72 and, at the same time, accumulates the data stream that has just been read from the memory card 130. That is why the data stream is accumulated in the buffer memory 71 at a rate of Vr−Vo. The data stream read out from the memory card 130 is stored in the window being managed by the partial FAT.

The interval c corresponds to the period to read the next partial FAT. The length of the interval c is equal to that of the interval a.

In the interval c, the buffer memory 71 just sends the data stream to the decoder 72 without accumulating the data stream supplied from the memory card 130. As a result, the amount of data accumulated in the buffer memory 71 decreases at the rate Vo. The following intervals d, e, etc. are the same as the intervals b and c and have lengths of $t_S$ and $t_{FR}$, respectively.

Now look at the interval c. In this interval c, the amount of data in the buffer memory 71 decreases at the rate Vo. Thus, to avoid discontinuing the content playback, the amount of data remaining in the buffer memory 71 when the interval c ends needs to be at least equal to zero. That is why at the beginning of the interval c (i.e., at the end of the interval b), the buffer memory 71 needs to have accumulated an amount of data that is at least equal to (Vo×$t_{FR}$). For that purpose, data in that amount needs to have been stored either continuously or discretely in the window being managed by the partial FAT that has been read already.

When expressed by mathematical equations, Vo×$t_{FR}$ is given by:

$$Vo \times t_{FR} = (Vr - Vo) \times t_S \quad (1)$$

Thus, $t_S$ is calculated by:

$$t_S = Vo \times t_{FR}/(Vr - Vo) \quad (2)$$

Therefore, the amount of data SR to be read continuously is given by:

$$SR = Vr \times t_S = Vr \times Vo \times t_{FR}/(Vr - Vo) \quad (3)$$

Consequently, while a data stream is being recorded, an available area, of which the size is at least equal to the amount of data SR, needs to be found in the window being managed by each partial FAT and the data needs to be written there. The recorder 10 of this preferred embodiment looks for and finds such an available area and writes the data there. As a result, even if the FAT is read on a partial FAT basis, the content can still be played back seamlessly.

The minimum unit of the available area is the continuous playback unit of 16 KB. In this preferred embodiment, the reading rate of Vr is supposed to be guaranteed if the data is written on the continuous playback unit of this size.

Hereinafter, the present invention will be described by way of specific examples. Suppose the transfer rate Vr from the memory card 130 to the buffer memory 71 is supposed to be 4 MB per second, the maximum transfer rate Vo from the buffer memory 71 to the decoder 72 is 30 Mb per second, and $t_S$ is 4 ms in the example illustrated in FIGS. 7 and 8.

In that case, SR is calculated 138 kilobytes according to Equations (1), (2) and (3). That is to say, if there is an available area of at least 138 kilobytes in one window area, the content can be played back seamlessly under the conditions specified above. According to this preferred embodiment, however, the data stream may be written if the size of the available area is 1 MB or more in order to allow some processing margin.

Figure 9:
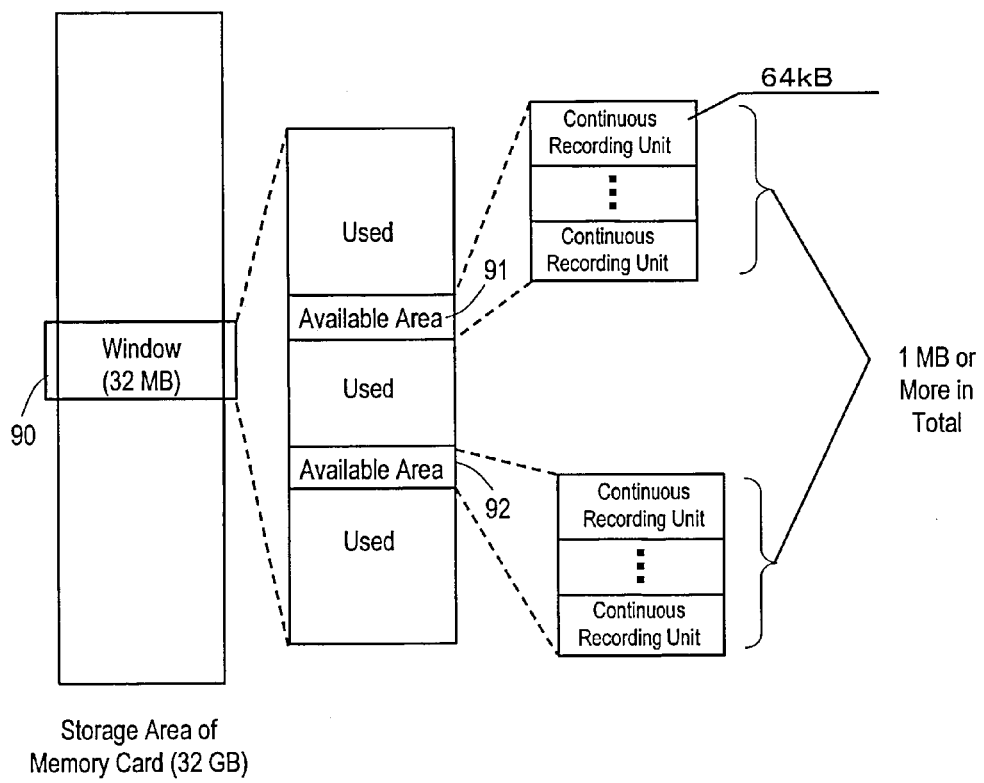
FIG. 9 shows exemplary conditions for ensuring an available area when moving pictures are recorded.

FIG. 9 shows exemplary conditions for ensuring an available area when moving pictures are recorded. If the size of a data storable area in the 32 MB window 90 in the storage area (i.e., logical address space) of the memory card 130 is at least equal to a predetermined value (e.g., 1 MB in total), the recorder 10 decides that the data can be written there and sequentially writes the stream on that area.

If the total size of the available areas is 1 MB, then those areas may consist of either continuous playback units or continuous recording units. In the example illustrated in FIG. 9, available areas with a total size of 1 MB or more consist of continuous recording units. Furthermore, not all of those available areas have to be arranged continuously. That is to say, multiple sets of continuous recording units may be present discretely in the window as in the two available areas 91 and 92 shown in FIG. 9. This is because within the same window 90 being managed by the partial FAT, there is no need to read different partial FATs and substantially no processing delay will be caused to track the FAT.

As there are many kinds of memory cards, some memory cards may have generally lower reading/writing rates than the memory card of this preferred embodiment. To guarantee a writing rate of 4 MB per second in real time for such a memory card, a data length that exceeds that of the continuous recording unit (of 64 kilobytes) needs to be adopted. For example, the recording length (i.e., the minimum continuous recording length) of the continuous recording unit should be approximately 640 kilobytes.

Hereinafter, specific processing to be done by the recorder 10 of this preferred embodiment during recording will be described in detail. First, the starting processing to be done by the recorder 10 will be described with reference to FIG. 10. After that, the recording processing will be described with reference to FIG. 11.

Figure 10:
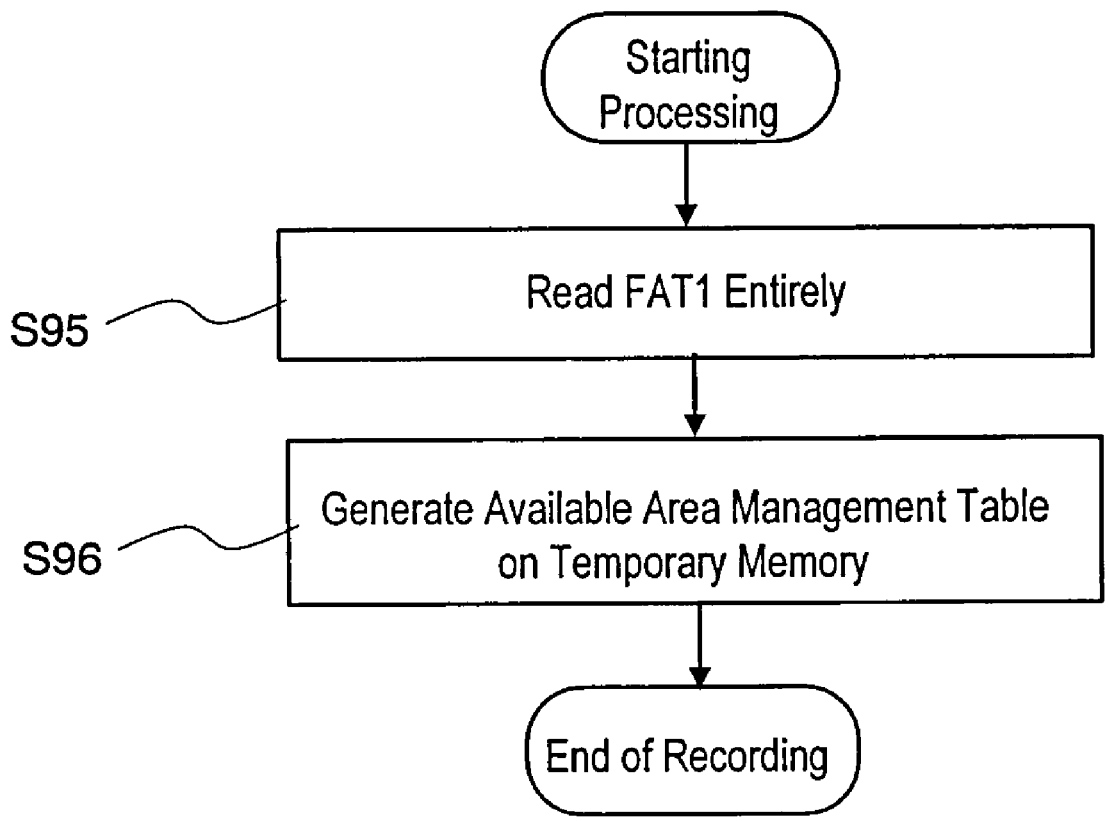
FIG. 10 is a flowchart showing the procedure of initializing processing to be done on the memory card when the recorder 10 is started.

FIG. 10 shows the procedure of initializing processing to be done on the memory card while the recording processing by the recorder 10 is getting started. To get the recording processing started, the user may turn ON the recorder 10 and may select a recording mode by turning a mode switch (not shown), for example.

The logical block management section 163 of the recorder 10 instructs the reading section 121 to read the FAT 1 from the memory card 130 entirely. Then, based on the FAT 1, the logical block management section 163 generates an available area management table that shows where there are available areas in all clusters. More specifically, the logical block management section 163 compiles an available area management table by compressing the data to one bit per cluster with an available cluster represented as "1" and a used cluster represented as "0". This compiling process is carried out sequentially while the partial FAT is being read. And this available area management table is stored on the RAM 183. As a result, the FAT 1 is saved with its overall size reduced to $\frac{1}{32}$. In recording moving pictures, the area detecting section 160 detects an available area by reference to this available area management table.

Next, the recording processing to be done by the recorder 10 will be described. Before starting the recording processing, the recorder 10 is supposed to have derived in advance information about the size of the partial FAT to be read during the playback processing and information about the amount of time it will take to read the partial FAT from the register of the memory card 130.

Figure 11:
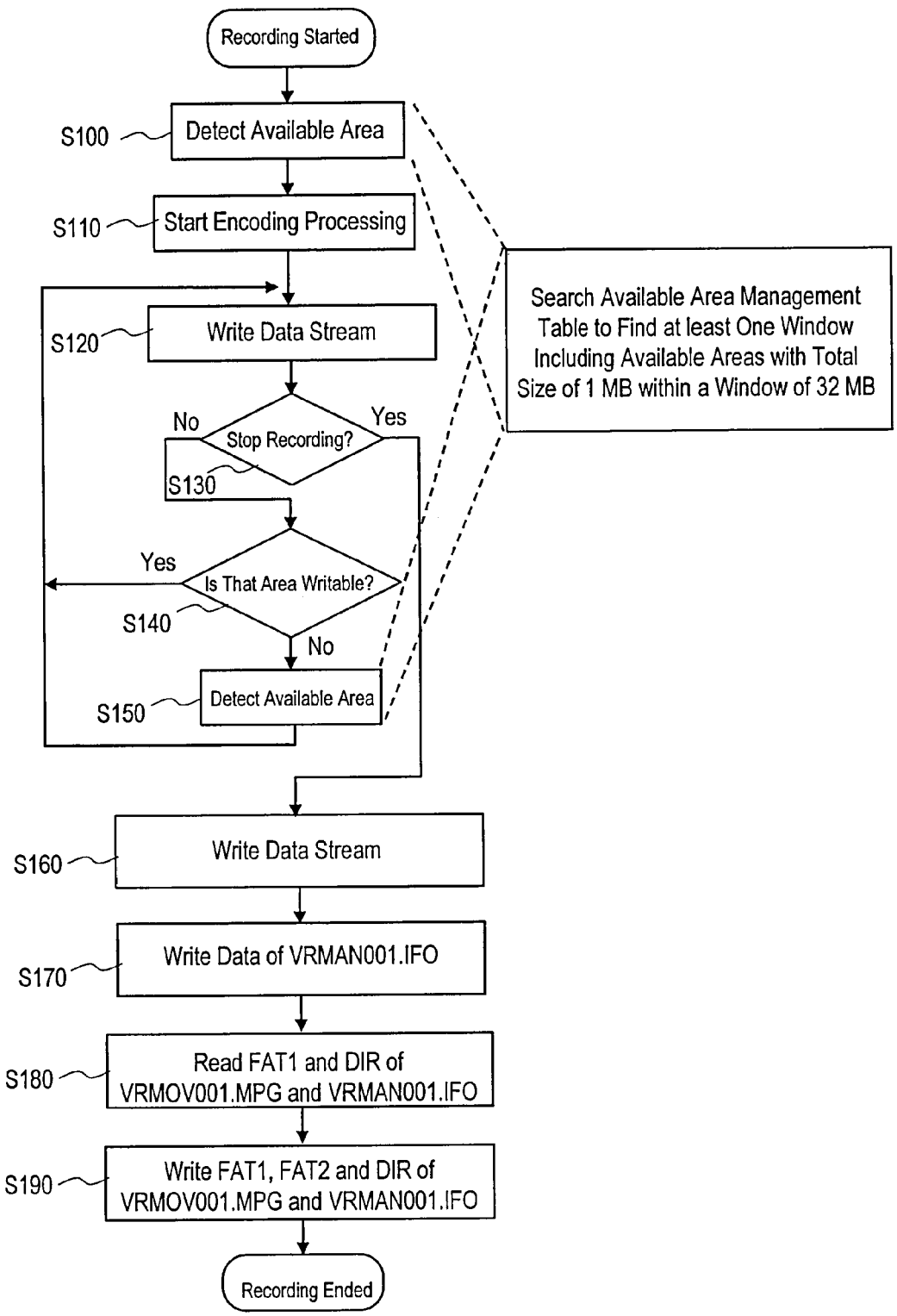
FIG. 11 is a flowchart showing the procedure of recording processing to be done by the recorder 10.

FIG. 11 shows the procedure of the recording processing to be done by the recorder 10. On receiving an instruction to start recording moving pictures from the user, the writing control section 161 and the area detecting section 160 are activated to detect an available area in Step S100. More specifically, the writing control section 161 calculates the data size of the content that will be played back during the period of time to read the partial FAT. The data size is supposed to be 1 MB as described above. Then, the area detecting section 160 searches the available area management table, thereby finding at least one window that includes available areas with a total size of 1 MB or more within a single window of 32 MB in Step S100.

Next, in Step S110, the writing control section 161 activates the MPEG encoder 170 and the writing section 120, thereby starting to write the data stream on the available area detected in Step S120. The write operation is actually performed by the writing section 120 in accordance with the instruction given by the writing control section 161. In the following description, however, the write operation is supposed to be done by the writing control section 161 for the sake of convenience.

If the user wants to continue recording (i.e., if the answer to the query of Step S130 is NO) and if additional data can be written on the area being recorded (i.e., if the answer to the query of Step S140 is YES), then the writing control section 161 continues to write the data stream on that area in Step S120. On the other hand, if it is determined that no data can be added to that area anymore (i.e., if the answer to the query of Step S140 is NO), then the area detecting section 160 detects the next available area in Step S150. In that case, the available area needs to be detected under the same conditions as in Step S100. Then, the writing control section 161 writes the data stream on the newly detected available area as the next target in Step S120.

If the user instructs that the recording be stopped by performing a recording stopping manipulation (i.e., if the answer to the query of step S130 is YES), then the writing control section 161 writes the remaining part of the data stream, which has not been written yet but is left on the temporary memory, onto the memory card in Step S160.

Subsequently, the writing control section 161 writes the data of the management data file VRMAN001.IFO onto the memory card 130 in Step S170. Then, the FAT 1, associated with the area in which VRMOV001.MPG and VRMAN001.IFO have been written, is read entirely in Step S180. If the data stream has a size of 2 GB, for example, the FAT of its associated FAT 32 file system has a size of at least 256 kilobytes.

Next, to indicate the status of the cluster on which the data stream has been written and which is now "used", the writing control section 161 writes FAT information (FAT chain) associated with VRMOV001.MPG and VRMAN001.IFO onto FAT1, FAT2 and the directory entry in Step S190, thereby finishing the recording processing.

Figure 12:
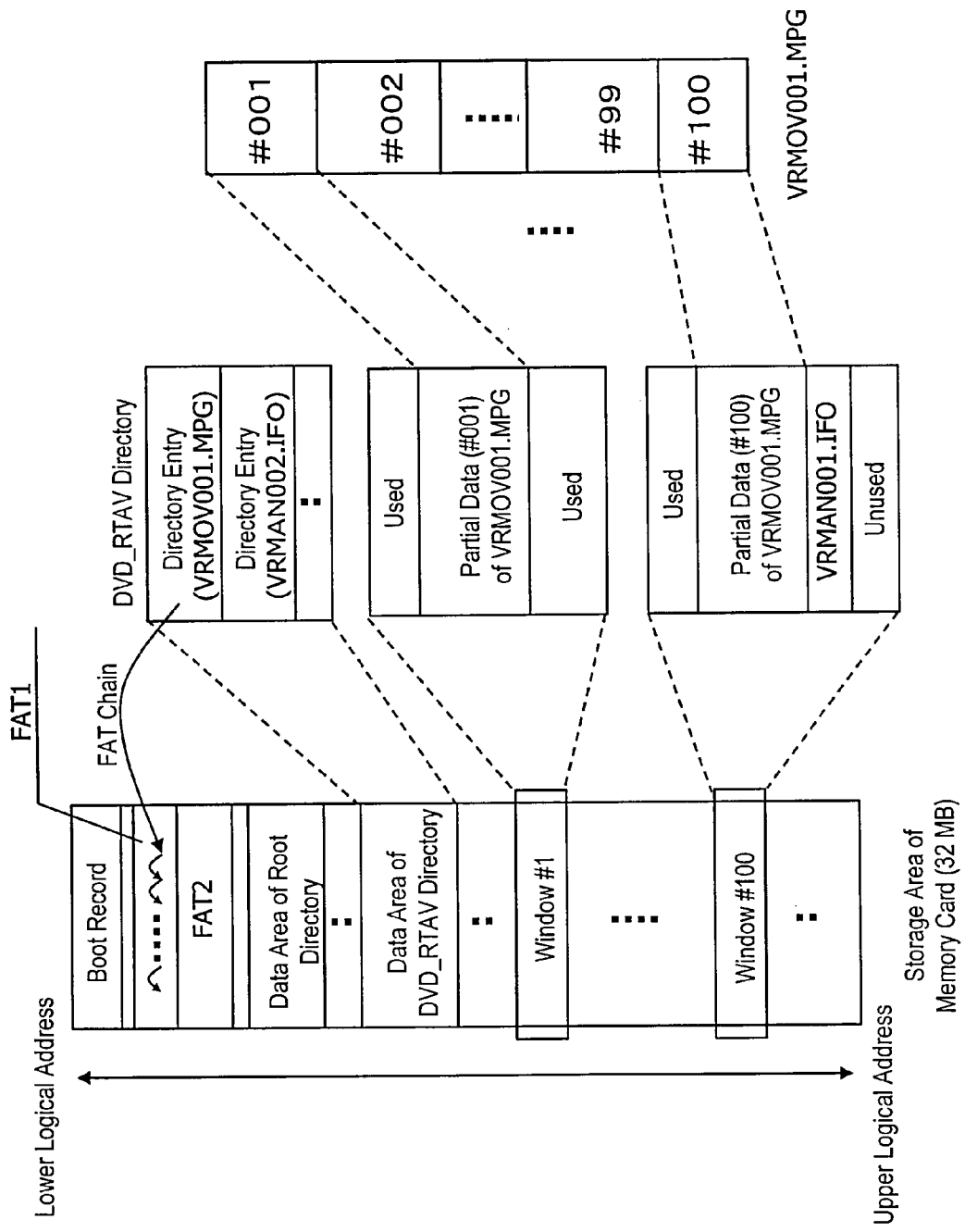
FIG. 12 shows how data may be arranged in the memory card 130 after the recording processing is finished.

FIG. 12 shows an exemplary arrangement of data in the memory card 130 after the recording processing. In the memory card 130, stored are a boot record, FAT1, FAT2, the data area of a root directory, and the data area of a DVD_RTAV directory in the ascending order of logical addresses. At the following logical addresses, a data stream file, a data stream's management file and so on are stored. In the DVD_RTAV directory, directory entries such as the VRMOV001.MPG file and the VRMAN002.IFO file are stored.

The storage area "window #1" of the memory card 130 consists of a used area, an area in which a portion (#001) of the data of the moving picture file VRMOV001.MPG is stored, and another used area. The area in which the moving picture file data is stored has a data size of 1 MB or more. As described above, these areas may be present discretely within window #1.

On the other hand, the storage area "window #100" consists of a used area, an area in which a portion (#100) of the data of the moving picture file VRMOV001.MPG is stored, the VRMAN001.IFO file, and another used area. The data of the moving picture file are stored separately as #1 through #100. However, this is just an example. This number may vary with the file size (i.e., the overall data size of the data stream).

Next, the processing of playing back a content such as video and/or audio by reading the data stream that has been written on the memory card 130 by such recording processing will be described.

Figure 13:
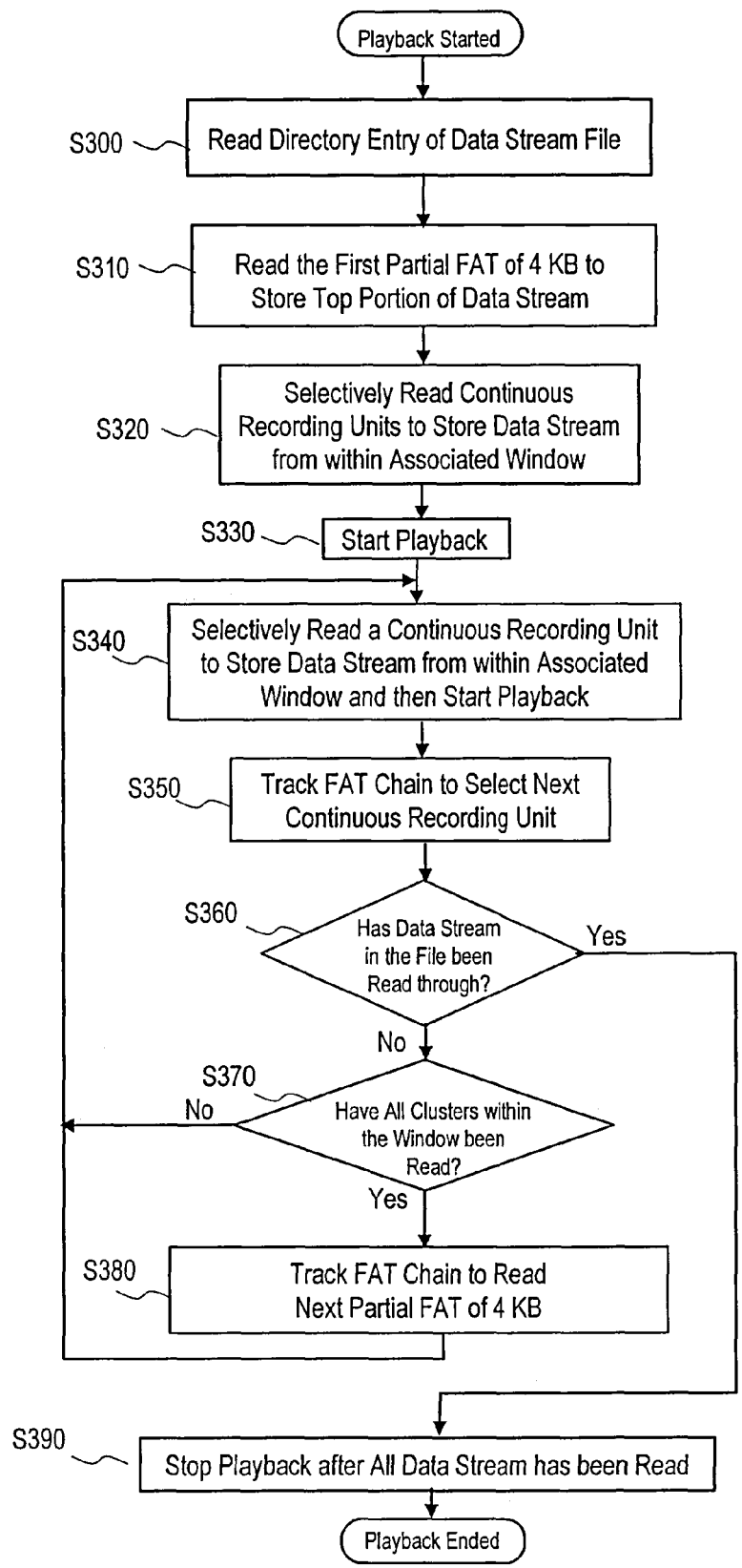
FIG. 13 is a flowchart showing the procedure of playback processing to be done by the recorder 10.

FIG. 13 shows the procedure of the playback processing to be done by the recorder 10. First, in Step S300, the reading control section 162 reads the directory entry of the data stream file that has been selected by the user. The read operation is actually performed by the reading section 121 in accordance with the instruction given by the reading control section 162. In the following description, however, the read operation is supposed to be done by the reading control section 162 for the sake of convenience.

Next, in Step S310, the reading control section 162 reads the partial FAT of 4 kilobytes. This partial FAT is used to manage a cluster to store the top portion of the data stream included in the directory entry that has been read out.

Thereafter, in Step S320, the reading control section 162 reads a predetermined number of continuous recording units to store the data stream from the window area that is associated with the 4 KB FAT, and then stores them on a temporary memory. Then, the reading control section 162 instructs the decoder 171 to start playback in Step S330. The amount of data to be read before playback is started may be at least equal to the quantity of video data that is equal to or greater than a VBV buffer size and that can be accumulated on a temporary memory.

The reading control section 162 selectively reads a continuous recording unit, in which the data stream is stored, from the window area being managed by that partial FAT. Then, the decoder 171 starts decoding and the content starts to be played back in Step S340.

Subsequently, the reading control section 162 further tracks the FAT chain by reference to the FAT, thereby detecting the cluster number associated with the next continuous recording unit in Step S350. If the end of the data stream being read has not been reached yet (i.e., if the answer to the query of Step S360 is NO), then the reading control section 162 sees if there are any unread continuous recording units left in the window in Step S370. If some unread units are left (i.e., if the answer to the query of Step S370 is NO), those units are read continuously in Step S340. On the other hand, if there are no unread units anymore (i.e., if the answer to the query of Step S370 is YES), then the reading control section 162 tracks the FAT chain, reads the partial FAT of the next four kilobytes in Step S380, and then continuously reads a single continuous recording unit in which the data stream is stored from the window area being managed by the partial FAT in Step S340.

On the other hand, if the end of the data stream has already been reached with nothing left to read (i.e., if the answer to the query of Step S360 is YES), then the data read operation ends. And after all of the data that has been read is played back, the playback processing is finished in Step S390.

By performing such playback processing, even if the recorder 10 alternately performs partial reading of the FAT and reading of the data stream, the desired transfer rate, required for the playback processing, can be maintained. As a result, the content can be played back continuously and seamlessly based on the data stream.

Since playback can be carried out with the FAT read little by little, the capacity of the memory to retain the FAT that has been read may be at least equal to the size of the FAT that has been read. That is why the required memory capacity can be much smaller than the capacity to store the entire FAT. In a 32 GB memory card, for example, the required memory capacity can be reduced from 4 MB to 512 bytes. Consequently, the cost of the memory needed for the recorder 10 can be cut down.

In addition, since only a part of the FAT needs to be read, the user's wait can be reduced significantly compared to the situation where the playback processing cannot be started until the FAT has been once read fully. In a 32 MB memory card, for example, it takes as long as three seconds to read the 4 MB FAT, whereas it takes just 0.01 seconds to 512 byte FAT.

By adopting the processing described above, every player can play back the given content seamlessly, no matter who manufactured the player. In addition, continuous playback is easier to realize even when a memory card with a big capacity or a memory card with low performance is used.

What is more, the window area described above may be set at any arbitrary data address. Besides, it is determined, by the overall size of the available areas in each window area, whether or not the data should be written there. That is why even if the available areas are discretely present within each window area, those areas can still be used effectively.

The processing of this preferred embodiment is also applicable to reading and/or writing a plurality of data streams. It should be noted, however, that the overall data size of the available areas to be provided within a window of a predetermined size increases. The size can also be calculated by Equations (1) to (3) described above.

The method of this preferred embodiment in which the FAT is read little by little on a partial FAT basis is radically different from the conventional method in which a moving picture stream does not start to be read until the FAT has been read fully. However, the data processor of the present invention may be designed so as to cope with both the reading method of this preferred embodiment and the conventional reading method by the FAT file system. Also, in this case, identification information may be provided such that the data processor can adopt the more appropriate reading method. For example, if a moving picture stream has been recorded so as to be played back by the playback method of this preferred embodiment, then the data processor just needs to store a management file, including identification information showing it, in the card separately. According to this method, the player can determine, by checking the identification information, whether the content should be played back by reading the FAT little by little or by reading the entire FAT at a time.

Optionally, the size of the partial FAT that should be read may be described separately, too.

Embodiment 2

Unlike the first preferred embodiment described above, the FAT information is written according to a second preferred embodiment of the present invention while the data stream is being recorded. In addition, the size of the available area to be provided in the window area is increased according to this preferred embodiment. The size of the available area is 1 MB in the first preferred embodiment described above but is increased to 8 MB according to this preferred embodiment.

The recorder of this preferred embodiment has the same configuration as the recorder 10 of the first preferred embodiment described above unless stated otherwise.

Figure 14:
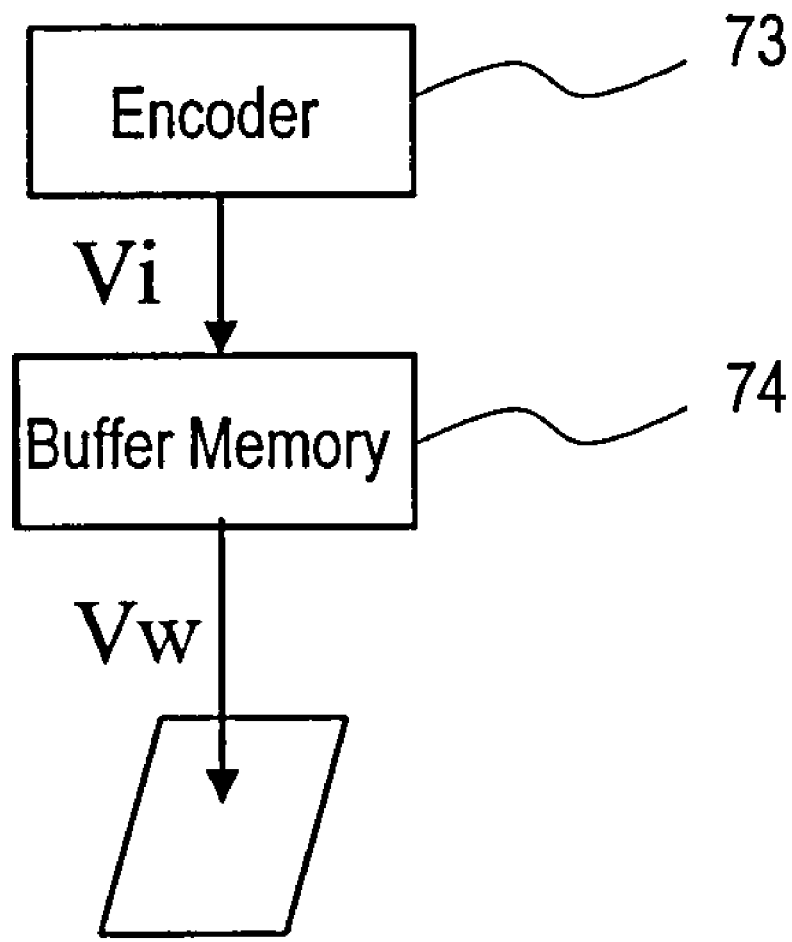
FIG. 14 shows a data recording model according to preferred embodiments of the present invention.

FIG. 14 shows a data recording model according to this preferred embodiment. The encoder 73 is supposed to correspond to the encoder 170 shown in FIG. 1, and the buffer memory 74 is supposed to be included in the writing section 120. Alternatively, the encoder 170 may include an internal memory corresponding to the buffer memory 74. It should be noted that the recording model shown in FIG. 14 is also satisfied by the recorder 10 of the first preferred embodiment that performs recording compliant with an MPEG standard, for example.

The data stream generated by the encoder 73 is input to the buffer memory 74 at the maximum rate Vi. Then, the data stream is written from the buffer memory 74 onto the memory card 130 at a rate that is at least equal to Vw.

Figure 15:
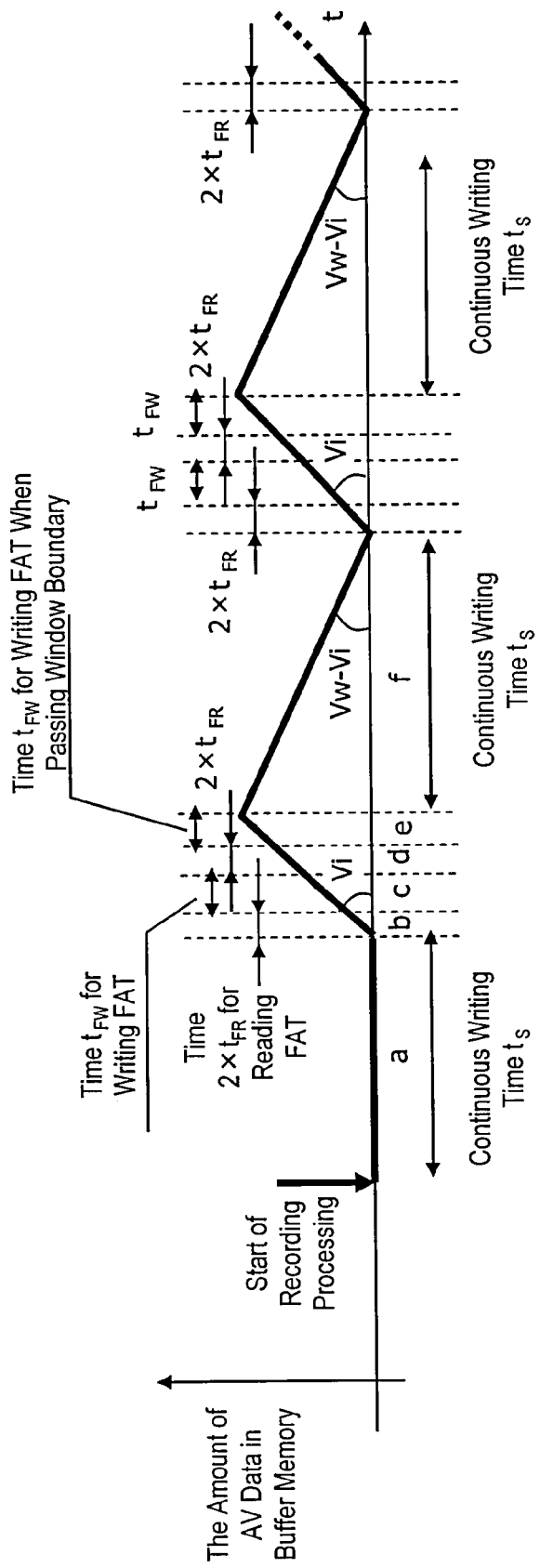
FIG. 15 shows how the amount of data accumulated in the buffer memory 74 of the recording model shown in FIG. 14 changes with time.

FIG. 15 shows how the amount of data accumulated in the buffer memory 74 of the recording model shown in FIG. 14 changes with time. As soon as the recording processing is started, the data stream starts to be written on the memory card continuously for at least a continuous writing time $t_S$ (in the interval a). Thereafter, a part (4 kilobytes) of FAT1 and a portion (4 kilobytes) of the directory entry information, by which the data stream file should be updated, are read in the interval b. Then, the FAT information of the data stream file (i.e., the portions to be updated of FAT1 and FAT2 and the directory entry) is updated in the interval c. If the window boundary is passed no sooner has a very small amount of data stream been written (no intervals are shown) after the interval c, the FAT information of the data stream file (i.e., the portions to be updated of FAT1 and FAT2 and the directory entry) is updated again as in intervals d and e. In the next continuous writing interval f, the amount of the data stream remaining in the buffer memory decreases at a rate of Vw-Vi. After that, the intervals b through f will recur over and over again.

Figure 16:
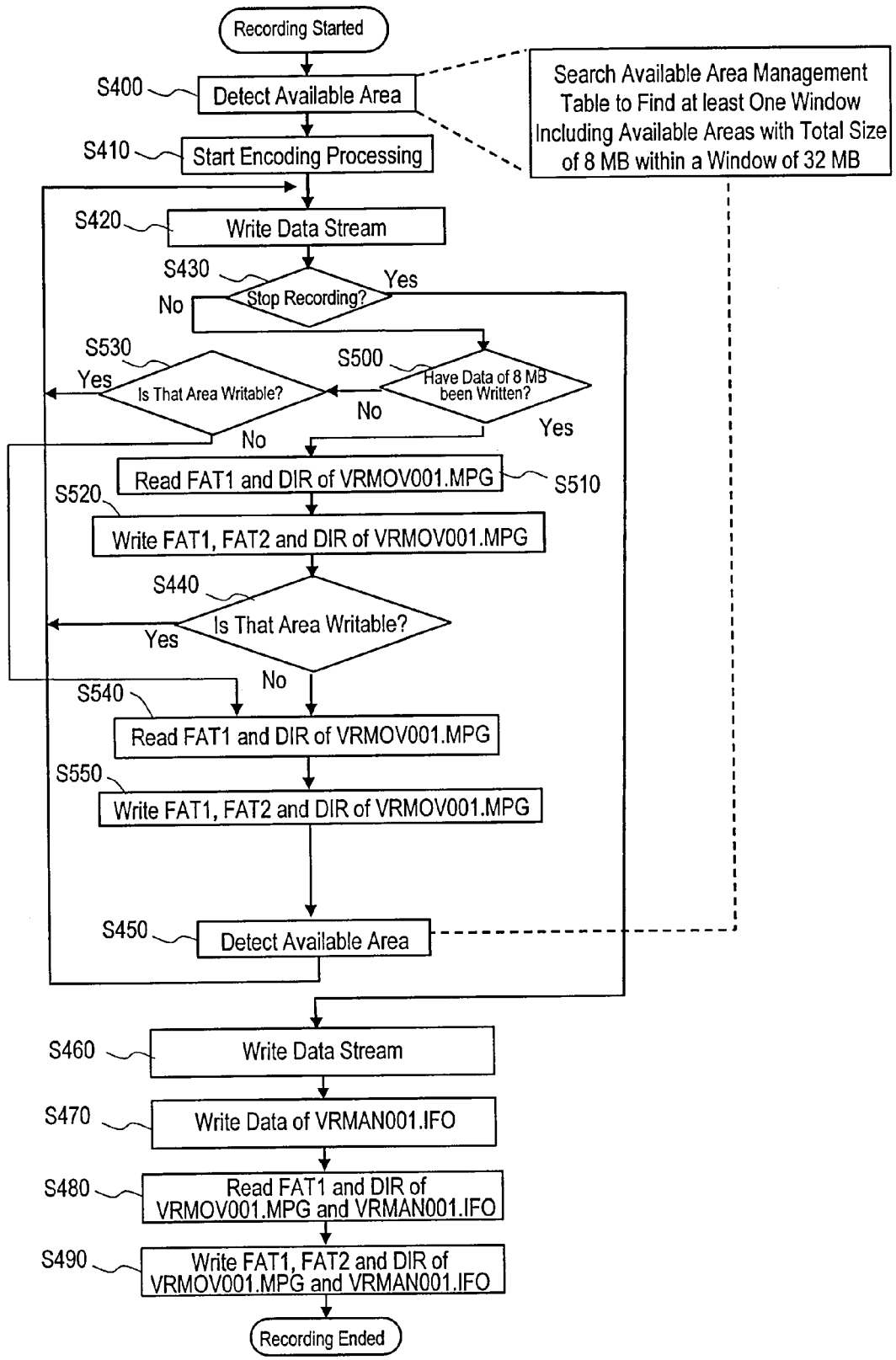
FIG. 16 is a flowchart showing the procedure of recording processing to be done by the writing control section 161 according to a second preferred embodiment of the present invention.

FIG. 16 shows the procedure of the recording processing to be done by the writing control section 161 of this preferred embodiment. Comparing this flowchart to FIG. 11 showing the first preferred embodiment, it can be seen that Steps S410, S420, S430, S440, S460, S470, S480 and S490 shown in FIG. 16 are the same as the counterparts shown in FIG. 11. However, in Steps S400 and S450, an available area with a size of 8 MB is detected in a 32 MB window area unlike the first preferred embodiment.

The processing steps S500, S510, S520, S530, S540 and S550 shown in FIG. 16 are also different from the counterparts shown in FIG. 11. Specifically, when 8 MB have been written continuously (i.e., if the answer to the query of Step S500 is YES) after the data stream has been written in Step S420, FAT1 and directory entry DIR, associated with the window area, are read in Step S510. Next, by using the data that has been read in Step S510 and the data size, recording time and FAT chain that have already been stored in the memory card, FAT1, FAT2 and directory entry of the data stream file VRMOV001.MPG are updated in Step S520.

Next, if data can be further added to the window (i.e., if the answer to the query of Step S440 is YES), writing is continued. On the other hand, if no data can be added to the window anymore (i.e., if the answers to the queries of Steps S530 and S440 are NO), the FAT information of the data stream file is updated in Steps S540 and S550 as in Steps S510 and S520.

To determine in Step S500 whether or not data of 8 MB has been written yet, the sum of the data stream written may be reset to zero when the processing step S510 or S540 is finished.

In this configuration, supposing the maximum transfer rate Vi from the encoder to the buffer memory is 30 Mb per second, the transfer rate Vw from the buffer memory to the memory card is 4 MB per second, the time tFR it takes to read FAT1 or directory entry of 4 KB is 4 ms, the sum of the times tFW it takes to write FAT1, FAT2 and directory entry is 110 ms in FIG. 16, the minimum continuous writing time of the data stream is $t_S$ and the continuous writing data size is SW as shown in FIG. 15, the minimum required data size in the window area satisfies the following Equation (4):

$$Vi \times 2 \times (t_{FW}+2 \times t_{FR})=(Vw-Vi) \times t_S \qquad (4)$$

Thus, the minimum continuous writing time $t_S$ is given by $$t_S=2 \times Vi \times (t_{FW}+2 \times t_{FR})/(Vw-Vi) \qquad (5)$$

Therefore, the continuous writing data size Sw is $$Sw=t_S \times Vw=2 \times Vw \times Vi \times (t_{FW}+2 \times t_{FR})/(Vw-Vi) \qquad (6)$$

As a result, Sw=7.96 MB<8 MB.

Consequently, if 8 MB are written continuously within a single window area, the data stream can be written with the FAT information of the data stream updated. In addition, the data stream with a size of 1 MB or more is also present in the window of that size. As a result, continuous reading is realized by performing the same playback processing as that of the first preferred embodiment described above.

In the preferred embodiment described above, the FAT information is supposed to be updated while the data stream is being recorded. Alternatively, the FAT information may be updated when another data stream is read or written. Optionally, a plurality of data streams may be read or written. In that case, however, the overall data size of the available areas to be provided within a window of a predetermined size increases.

If the size Sw of the data to be written continuously is smaller than the continuous recording unit to guarantee the transfer rate Vw to be determined by the card's performance, then the size of the data to be written continuously may be increased to that of the continuous recording unit.

Embodiment 3

A third preferred embodiment of the present invention is a modified example of a data storage method. This method may be carried out by using either the recorder of the first preferred embodiment or the recorder of the second preferred embodiment unless stated specifically.

Figure 17:
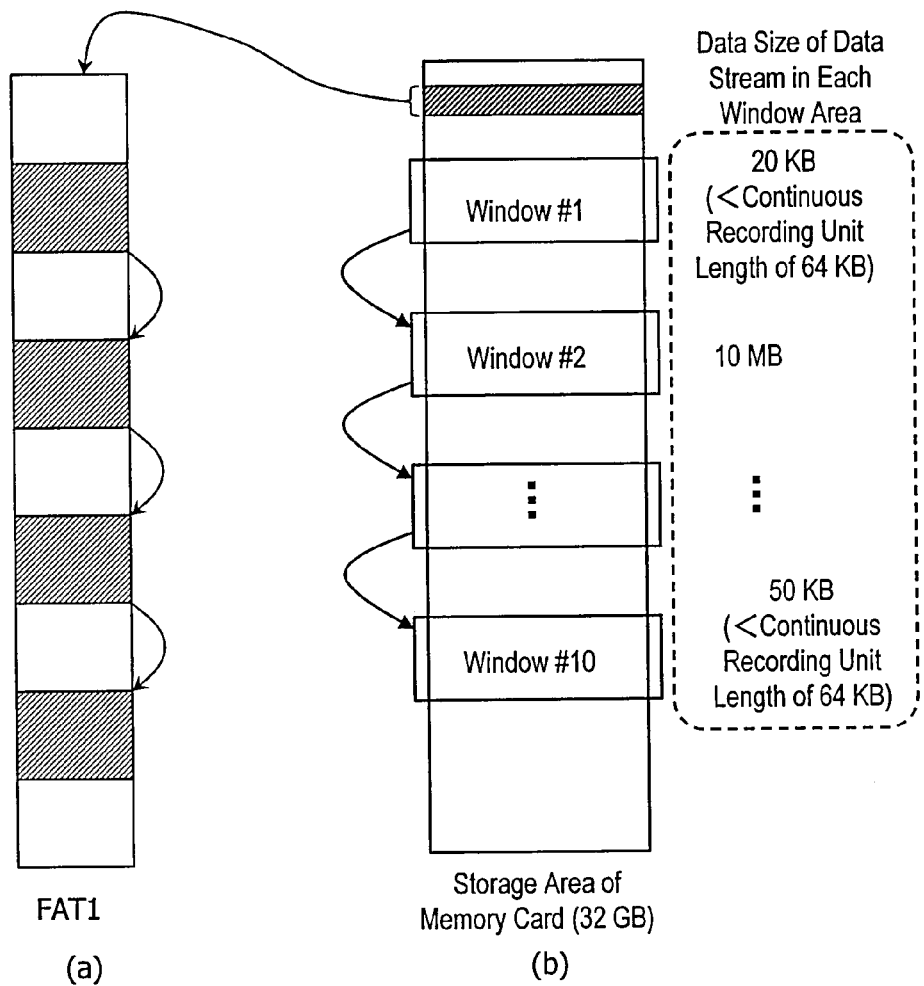
FIG. 17 shows exemplary storage locations and exemplary data sizes of a data stream according to a third preferred embodiment of the present invention.

FIG. 17 shows exemplary storage locations and exemplary data sizes of a data stream according to this preferred embodiment. Specifically, portion (a) of FIG. 17 shows an FAT that defines how to link the data between windows, while portion (b) of FIG. 17 shows relations between the window areas and their data sizes.

The data stream has been recorded separately in Windows #1 through #10. A portion of the data stream of 20 kilobytes is included in Window #1. The portions of the data stream that are stored in Windows #1 through #9 have data sizes of 8 MB or more. And a portion of the data stream of 50 kilobytes is stored in Window #10.

In the first and second preferred embodiments described above, the data stream is supposed to be stored in every continuous recording unit. According to this preferred embodiment, however, as for a window in which the data at the top portion of the data stream file is stored, the data does not have to be stored in every continuous recording unit. For example, if the continuous recording unit has a size of 64 KB, data of just 32 KB, which is less than 64 KB, may be stored in Window #1.

However, if the top portion of the data stream, of which the data size is less than that of the continuous recording unit, is present outside of the window areas, then the following processing needs to be carried out. Specifically, before the data to be played back starts to be decoded, a lot of the data stream needs to have been read in the buffer memory shown in FIG. 14. This is needed to prevent the buffer memory from causing an underflow while the partial FAT is being read for the first time. For example, as for the first preferred embodiment, the decoding may be started after the data of $Vo \times t_{FR}$ has been read.

As for the top portion of a data stream file, the data should rather not be stored in every continuous recording unit in the window in a situation where the data stream file is split into two files or in a situation where the front portion of the data stream file is deleted. In these situations, the data streams before and after the splitting point may have a combined data size that exceeds the maximum permissible overall data size of a single window area as a result of the splitting processing or the front portion deleting processing. Among other things, in the situation where the split processing needs to be performed, a required portion of the cluster including the splitting point needs to be copied as either the data stream file before the splitting point or the data stream file after the splitting point and then stored as an integral part of at least one of the two files (i.e., either as a part of the file before the splitting point or as a part of the file after the splitting point).

Likewise, the window area, including the top portion of the data stream file, does not have to include a predetermined amount of data (of 1 MB in the first preferred embodiment and 8 MB in the second preferred embodiment, for example), either. In this case, if the splitting processing or the front portion deleting processing is supposed to be performed, something special needs to be done during the playback processing, too. More specifically, the data stream needs to have been read excessively into the buffer memory shown in FIG. 7 to the point that the buffer memory never causes an underflow even if a single partial FAT is read before the data starts to be decoded.

By adopting such a technique, the splitting processing can be finished easily. In addition, continuous playback of data stream files can be guaranteed easily even if those files are split ones.

It should be noted that as for the window that stores data in the end portion of a data stream file, the data does not have to be stored in every continuous recording unit of the available area, either. For example, no data stream may be stored after a halfway point of the available area. This is because the data stream may have an arbitrary data size and because rear portion deleting processing may happen.

In the foregoing description of preferred embodiments, the window size is supposed to be 32 MB. Alternatively, in the processing steps S310 and S380 of the playback processing shown in FIG. 13, a partial FAT to manage an area of 16 KB, not 4 KB, may be read and an available area may be searched for with the window size set at 128 MB. In that case, however, $t_{FR}$ in Equation (1) or (4) needs to be increased fourfold.

Furthermore, if a partial FAT to manage a continuous area of not 4 KB but 8 KB, for example, is read, then the memory area can be used more effectively. More specifically, the end portion of the memory area being managed by the partial FAT (and having a size of around 4 KB) can be used more effectively. This is because if an available area covers both the end portion of a memory area being managed by a partial FAT and the top portion of the next memory area being managed by the next partial FAT, then the combined size of these two areas may be managed as the value of the available area.

Figure 19:
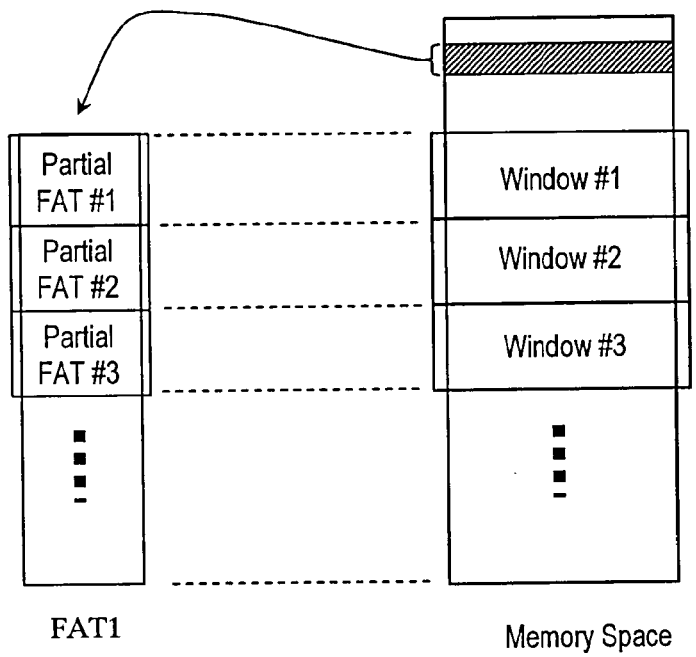
FIG. 19 shows an exemplary relation between partial FATs and a memory space.
Figure 20:
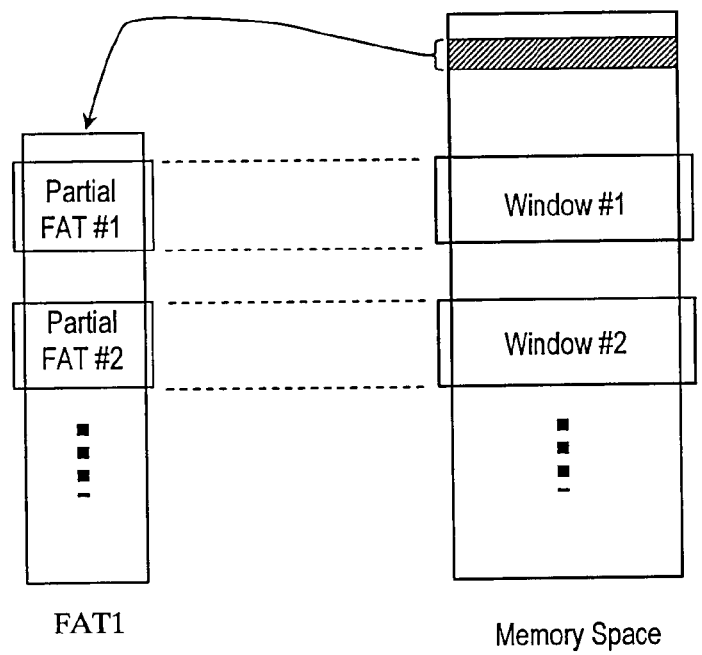
FIG. 20 shows another exemplary relation between partial FATs and a memory space.

Also, in the preferred embodiments described above, neither the partial FATs nor the respective memory areas being managed by the partial FATs are supposed to overlap with each other as shown in FIG. 19. However, the partial FAT may be a continuous area that has a size of 4 KB as counted from an FAT entry, corresponding to the top address of the data stream file, and the respective memory areas being managed by the partial FAT may overlap with each other. This means that the area being managed by a partial FAT or the top position of the partial FAT may be determined arbitrarily as shown in FIG. 20. This also means that the top sector being managed by the partial FAT does not have to coincide with the sector boundary although the top sector is supposed to coincide with the sector boundary in the foregoing description.

In the foregoing description of preferred embodiments, the processing delay caused by the memory card interface is not mentioned. However, in view of the processing delay $t_{oh}$, Equation (1) may be modified into the following Equation (7):

$$Vo \times (t_{FR} + t_{oh}) = (Vr - Vo) \times t_S \qquad (7)$$

Furthermore, considering the processing delay caused by the memory card interface, the maximum value of Vo may be slightly reduced to approximately 80% of Vr, for example.

Figure 18:
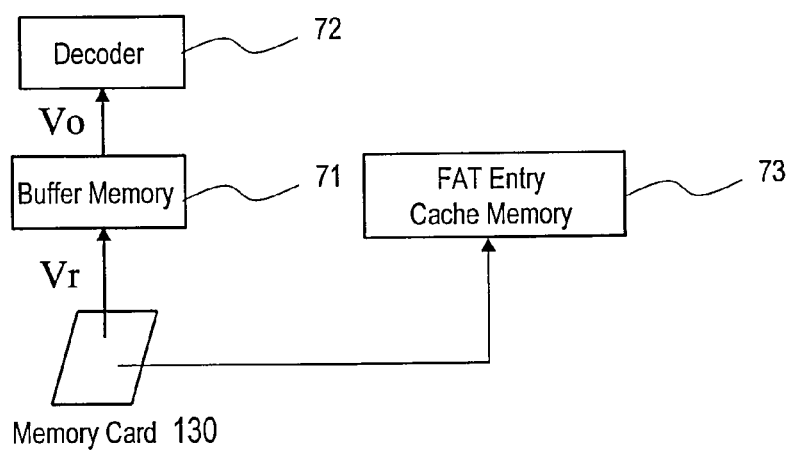
FIG. 18 shows a configuration including a memory to store partial FATs.

Also, in the preferred embodiments described above, the model shown in FIG. 7 does not specifically show any memory to store partial FATs. FIG. 18 shows a configuration including a memory to store partial FATs. Furthermore, the partial FAT is supposed to consist of consecutive sectors in the foregoing description. Alternatively, discrete partial FATs, each having a size of 4 KB, may be selected, too.

The processing of recording moving pictures with the pictures compressed in real time has been described.

Alternatively, an SD card may be inserted into a memory card reader that is connected to a PC and moving picture data may be written in a data area inside the window in non-real time. In that case, the recording processing may be carried out such that the overall size of continuous playback units within the window becomes 1 MB or more compared to the first preferred embodiment, for example.

Also, the operations to be performed during normal playback processing have been described mainly. However, in a high-speed playback using only I-frames, the update rate of I-frames may be shortened, too.

Furthermore, in the preferred embodiments described above, the data stream transfer rates Vi and Vo are supposed to be 30 Mbps. However, the transfer rates may be lower, too. In that case, the combined size of the available areas that should be provided within the window area may be either decreased or the same as the situation where the transfer rates are 30 Mbps.

Also, in the preferred embodiments described above, the interval in which reading of a data stream file is suspended during the playback operation is supposed to be equal to the time for reading a partial FAT. However, the interval may further include a time for reading another data, a time for writing another data, and so on. That is to say, as long as reading of a data stream to be played back is suspended, any type of processing may be carried out in the meantime.

In the preferred embodiments described above, the memory card 130 is supposed to be removable. However, this is just an example. As long as the medium can be used to manage files by the file system described above, any other semiconductor storage medium (such as an FeRAM or an MRAM) or an optical disk such as a DVD-RAM, an MO, a DVD-R, a DVD-RW, a DVD+RW, a DVD+R, a CD-R or a CD-RW may also be used. The medium may even be a fixed, non-removable medium (such as a hard disk) that is built in the recorder 10.

Furthermore, the FAT 32 file system is supposed to be adopted for the preferred embodiments described above. Alternatively, the FAT 16 file system or the FAT 12 file system may be adopted instead. As another alternative, any other file system may also be adopted as long as the file management structure of the file system is similar to that of the FAT 32, FAT 16 or FAT 12 file system.

The respective functional blocks such as those shown in FIG. 1, for example, are typically implemented as an LSI (large-scale integrated circuit) chip such as the CPU 181. These functional blocks may be integrated together into a single chip either fully or just partially. In FIG. 1, for example, the MPEG encoder 170 and the system control section 180 are shown as mutually different functional blocks. However, these blocks may be implemented either as two different semiconductor chips or as physically the same chip. Optionally, the functions of the system control section 180, the MPEG encoder 170 and the MPEG decoder 171 may be integrated together into a single chip circuit. However, only the memory that stores the data to be encoded or decoded may be excluded from the blocks to be integrated together.

It should be noted that the LSI mentioned above is sometimes called an IC, a system LSI, a super LSI or an ultra LSI depending on the number of devices that are integrated together per unit area. The integrated circuit does not have to be an LSI but may also be implemented as a dedicated circuit or a general-purpose processor. Optionally, after an LSI has been fabricated, a programmable FPGA (field programmable gate array) or a reconfigurable processor in which the connection or setting of circuit cells inside the LSI are changeable may be adopted.

As another possibility, a novel integrated circuit technology to replace LSIs might be developed in the near future as a result of advancement of the semiconductor technology or any other related technology. In that case, the functional blocks could be integrated together by that novel technology. For example, the functional blocks could be integrated together as bio elements by utilizing some biotechnology.

Furthermore, in the preferred embodiments described above, the data stream is supposed to be a program stream. Alternatively, the data stream may also be a bit stream such as a transport stream or a PES stream. Also, the video is supposed to be represented by an MPEG-2 video stream but may also be an MPEG-4 video stream or an MPEG-4 AVC stream. Likewise, the audio may also be a linear PCM audio stream or an Ac-3 stream. Optionally, not only video and audio but also other types of multimedia information (such as graphics information and character information) may be included as well.

Also, in the preferred embodiments described above, the entire program stream (i.e., the entire VOB) is supposed to be stored in a single data stream file. Alternatively, the program stream may be separately stored as a number of different data stream files. Furthermore, all management data about the data stream file is supposed to be stored in a single management file. However, the management data may be separately stored in management data files of multiple data stream files.

INDUSTRIAL APPLICABILITY

If a data stream is recorded on a storage medium (such as a memory card, for example) by using the apparatus and method of the present invention, the desired transfer rate can be easily realized during the playback operation. That is why the content can be played back continuously without freezing the processing being done by the player and without missing any frame of the moving pictures or discontinuing the audio. In addition, the data stream is recorded according to the transfer rate of a given storage medium. Thus, it is easier to guarantee compatibility between multiple different players produced by different manufacturers and make those players play back the data stream continuously as long as the players can read the storage medium appropriately. What is more, even a memory card with a huge capacity or with relatively low performance can easily guarantee compatibility for the purpose of continuous playback. Besides, the available area can be used as the area to store data on a smaller unit with the transfer rate of the data stream maintained.

The invention claimed is:

1. A data processor comprising:
a reading section operable to read a partial FAT, which forms a part of a file allocation table (FAT), from a storage medium in which a storage location of data is defined based on the FAT;
a control section operable to instruct said reading section to read a data stream representing a content from the storage medium based on the partial FAT; and
a decoding section operable to play back the content based on the data stream that has been read;
wherein after at least a predetermined amount of a first data stream has been read based on a first partial FAT and while playback processing is carried on by said decoding section, said reading section reads a second FAT that follows the first FAT, and said control section instructs said reading section to read a second data stream based on the second FAT; and
wherein the predetermined amount of the first data stream is an amount of data to be read continuously until a portion of the data stream, which should be played back during a data stream reading suspended period, is acquired, the data stream reading suspended period including at least a time for reading the second partial FAT.

2. The data processor of claim 1, wherein the storage medium has a predetermined continuous data unit which is readable at a rate that is equal to or higher than a playback rate of the data stream; and
wherein each of partial areas to be managed based on the first partial FAT or the second partial FAT is a collection of the continuous data units; and
wherein said control section is operable to instruct the reading section to read the data stream based on the partial FAT; and
wherein said reading section is operable to read the data stream at a rate that is equal to or higher than a playback rate of the data stream.

* * * * *